(12) United States Patent
Tompkins et al.

(10) Patent No.: US 10,539,792 B1
(45) Date of Patent: Jan. 21, 2020

(54) APPARATUS, SYSTEM, AND METHOD FOR ADJUSTING HEAD-MOUNTED-DISPLAY STRAPS

(71) Applicant: FACEBOOK TECHNOLOGIES, LLC, Menlo Park, CA (US)

(72) Inventors: Glen Jason Tompkins, Woodinville, WA (US); Joseph Patrick Sullivan, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 189 days.

(21) Appl. No.: 15/600,348

(22) Filed: May 19, 2017

(51) Int. Cl.
*G02B 27/01* (2006.01)

(52) U.S. Cl.
CPC ..... *G02B 27/0149* (2013.01); *G02B 27/0176* (2013.01); *G02B 27/0179* (2013.01); *G02B 27/017* (2013.01); *G02B 2027/0152* (2013.01); *G02B 2027/0154* (2013.01)

(58) Field of Classification Search
CPC ........... A42B 3/08; A42B 3/145; A42B 3/324; A42B 3/185; A42B 7/00; G02B 27/017; G02B 27/0176; G02B 27/0172; G02B 2027/0178; G02B 27/0179
See application file for complete search history.

(56) References Cited

U.S. PATENT DOCUMENTS

| | | | | |
|---|---|---|---|---|
| 5,321,416 A * | 6/1994 | Bassett | ................ | A42B 3/145 345/8 |
| 5,774,096 A * | 6/1998 | Usuki | ................ | G02B 7/12 340/980 |
| 5,844,530 A * | 12/1998 | Tosaki | ................ | G02B 27/017 345/8 |
| 2006/0015986 A1* | 1/2006 | Bielefeld | ................ | A42B 3/145 2/181 |
| 2008/0109947 A1* | 5/2008 | Dubois | ................ | A42B 3/145 2/414 |
| 2008/0184451 A1* | 8/2008 | Lemke | ................ | A42B 3/145 2/8.2 |

(Continued)

OTHER PUBLICATIONS

Joseph Patrick Sullivan; Apparatus, System, and Method for Adjusting Head-Mounted-Display Straps, U.S. Appl. No. 15/615,775, filed Jun. 6, 2017.

(Continued)

*Primary Examiner* — Koosha Sharifi-Tafreshi
(74) *Attorney, Agent, or Firm* — FisherBroyles, LLP

(57) ABSTRACT

A head-mounted-display adjustment apparatus may include a strap with a distal section coupled to a distal area of a head-mounted display. The adjustment apparatus may also include a pinion rotatably coupled to a proximal area of the head-mounted display in a manner that holds the head-mounted display against a user's face when a user is wearing the head-mounted display. In addition, the adjustment apparatus may include a rack that is coupled to a proximal section of the strap and includes a plurality of teeth in mesh with the pinion such that (1) rotation of the pinion repositions the rack relative to the head-mounted display and (2) repositioning the rack adjusts an area between the strap and the head-mounted display. Various other head-mounted-display adjustment apparatuses, systems, and methods are also disclosed.

20 Claims, 19 Drawing Sheets

(56) References Cited

U.S. PATENT DOCUMENTS

| | | | |
|---|---|---|---|
| 2008/0238815 A1* | 10/2008 | Ishino | G02B 27/017 345/8 |
| 2008/0276354 A1* | 11/2008 | Stokes | A42B 3/145 2/418 |
| 2016/0299346 A1 | 10/2016 | Allin et al. | |
| 2016/0363768 A1 | 12/2016 | Drinkwater et al. | |
| 2016/0363996 A1 | 12/2016 | Higgins et al. | |
| 2016/0366503 A1 | 12/2016 | Miller et al. | |
| 2017/0123451 A1* | 5/2017 | Baudou | G06F 1/163 |
| 2017/0337737 A1* | 11/2017 | Edwards | F16M 13/04 |
| 2018/0003984 A1* | 1/2018 | Lai | A42B 7/00 |
| 2018/0295733 A1* | 10/2018 | Wen | H05K 5/0017 |

OTHER PUBLICATIONS

Glen Jason Tompkins et al.; Apparatus System and Method for Adjusting Head-Mounted-Display Straps; U.S. Appl. No. 15/586,270, filed May 4, 2017.

Peter Wesley Bristol et al.; Apparatus, System, and Method for Adjusting Head-Mounted-Display Straps; U.S. Appl. No. 15/582,566, filed Apr. 28, 2017.

* cited by examiner

Method 1900

APPARATUS, SYSTEM, AND METHOD FOR ADJUSTING HEAD-MOUNTED-DISPLAY STRAPS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use them as visualization aids.

In any use of a virtual reality headset, making the experience as immersive as possible may be critical. Regrettably, a variety of factors may disrupt virtual-reality immersion, and one of the most significant disruptions to having an immersive experience may be an ill-fitting headset. Since many headsets may be relatively heavy with most of their weight distributed toward the front, a poor fit may result in significant pressure on a user's face, leading to discomfort that may make a virtual reality experience less compelling.

Traditional virtual reality headsets may provide some limited options for addressing a poor fit, but these options may be sub-optimal. For example, adjusting a traditional headset for comfortable facial pressure and proper size may involve making numerous manual changes over several fitting attempts. This process may be surprisingly time-consuming, and for some users, finding a good fit may be quite difficult. The problem of achieving a good fit may be exacerbated for headsets that are used by multiple people, which may necessitate a refitting before each use. And finding a good fit isn't the only problem with using virtual reality headsets—the configuration of some traditional headset straps may result in awkward, uncomfortable, or comical attempts at putting on or removing headsets.

SUMMARY

As will be described in greater detail below, the instant disclosure generally relates to head-mounted-display strap apparatuses, systems, and methods. In some embodiments, a head-mounted-display adjustment apparatus may include a strap with a distal section coupled to a distal area of a head-mounted display. The apparatus may also include a pinion rotatably coupled to a proximal area of the head-mounted display in a manner that holds the head-mounted display against a user's face when a user is wearing the head-mounted display. In addition to the pinion, the apparatus may include a rack that is coupled to a proximal section of the strap and includes a plurality of teeth in mesh with the pinion such that (1) rotation of the pinion repositions the rack relative to the head-mounted display and (2) repositioning the rack adjusts an area between the strap and the head-mounted display.

In some examples, the pinion may drive a gear train that includes a set of gears and couples a slide to the rack such that rotation of the pinion moves the rack along the slide. In these examples, the gear train may be housed by the slide and may increase a range of motion of the rack such that the rack is extendable beyond the pinion. In additional examples, the rack may be coupled to the proximal section of the strap such that the proximal section of the strap moves in tandem with the rack.

In one embodiment, the apparatus may further include a graspable knob coupled to the pinion such that rotation of the knob rotates the pinion. In this embodiment, the graspable knob may be configured to adjust a distance of the head-mounted display to a user's face when a user is wearing the head-mounted display.

In one example, the apparatus may also include a constant-force spring that includes a ribbon with a rolled portion and a protracted section that extends from the rolled portion. In this example, the rolled portion of the ribbon may be housed by the slide such that, when the rack moves away from the slide, the ribbon unrolls and the strap extends away from the head-mounted display. Furthermore, in this example, the protracted section of the ribbon may be anchored to the rack. Additionally or alternatively, the constant-force spring may provide a tension holding the head-mounted display against the user's face when the user is wearing the head-mounted display.

According to various embodiments, a corresponding head-mounted-display system may include a head-mounted display, a strap with a distal section coupled to a distal area of the head-mounted display, and a rack-and-pinion assembly coupled to a proximal section of the strap and a proximal area of the head-mounted display such that, when a user is wearing the head-mounted display, the strap holds the head-mounted display against the user's face. In these embodiments, the rack-and-pinion assembly may include a pinion rotatably coupled to the proximal area of the head-mounted display and a rack in mesh with the pinion such that rotation of the pinion repositions the rack relative to the head-mounted display. Furthermore, repositioning the rack may adjust an area between the strap and the head-mounted display. Additionally or alternatively, the strap may include a medial section coupled to a third section of the head-mounted display that is dimensioned to be positioned at a forehead of the user.

In some examples, the system may include more than one head-mounted-display adjustment apparatus, as shown in various embodiments herein. For example, the distal section of the strap may be coupled to the distal area of the head-mounted display via an additional rack-and-pinion assembly with an additional pinion rotatably coupled to the head-mounted display and an additional rack in mesh with the additional pinion such that rotation of the additional pinion repositions the additional rack relative to the head-mounted display. Repositioning the additional rack may adjust the area between the strap and the head-mounted display. In this example, the rack-and-pinion assembly may be connected to a first section of the head-mounted display that is dimensioned to be positioned at a right side of the user's head, and the additional rack-and-pinion assembly may be connected to a second section of the head-mounted display that is dimensioned to be positioned at a left side of the user's head.

In one embodiment, the rack-and-pinion assembly may further include a graspable knob coupled to the pinion such that rotation of the knob rotates the pinion. The rack-and-pinion assembly may also include a constant-force spring that provides a tension holding the head-mounted display against the user's face when the user is wearing the head-mounted display. Similarly, the additional rack-and-pinion assembly may include an additional graspable knob coupled to the additional pinion such that rotation of the additional knob rotates the additional pinion and an additional constant-force spring that provides an additional tension holding the head-mounted display against the user's face when the user is wearing the head-mounted display. Furthermore, rotation of the knob to reposition the rack relative to the head-mounted display may adjust the area between the strap and the head-mounted display separately from rotation of the additional knob to reposition the additional rack relative to the head-mounted display.

In some examples, the constant-force spring may include a ribbon with (1) a rolled portion that may be housed by a slide coupled to the rack such that, when the rack moves away from the slide, the ribbon unrolls and the strap extends away from the head-mounted display and (2) a protracted section anchored to the rack that extends from the rolled portion. Similarly, the additional constant-force spring may include an additional ribbon with (1) an additional rolled portion that may be housed by an additional slide coupled to the additional rack such that, when the additional rack moves away from the additional slide, the additional ribbon unrolls and the strap extends away from the head-mounted display and (2) an additional protracted section anchored to the additional rack that extends from the additional rolled portion. Additionally or alternatively, the tension of the constant-force spring may approximate the additional tension of the additional constant-force spring.

In addition to the various systems and apparatuses described herein, the instant disclosure presents exemplary methods associated with head-mounted-display strap systems. For example, a method may include coupling a distal section of a strap to a distal area of a head-mounted display. The method may also include rotatably coupling a pinion to a proximal area of the head-mounted display in a manner that holds the head-mounted display against a user's face when a user is wearing the head-mounted display. Additionally, the method may include coupling a rack with a plurality of teeth in mesh with the pinion to a proximal section of the strap such that (1) rotation of the pinion repositions the rack relative to the head-mounted display and (2) repositioning the rack adjusts an area between the strap and the head-mounted display. In further examples, the method may include coupling a graspable knob to the pinion such that rotation of the knob rotates the pinion.

In one embodiment, coupling the pinion to the proximal area of the head-mounted display may include coupling a slide to the rack such that rotation of the pinion moves the rack along the slide and coupling the rack to the proximal section of the strap such that the proximal section of the strap moves in tandem with the rack. Additionally, coupling the pinion to the proximal section of the strap may include housing a gear train, driven by the pinion, at the slide.

In examples where a constant-force spring includes a ribbon having a rolled portion and a protracted section that extends from the rolled portion, the method may also include housing the rolled portion of the constant-force spring at the slide such that, when the rack moves away from the slide, the constant-force spring unrolls and the strap extends away from the head-mounted display. Additionally, these examples may include anchoring the protracted section of the constant-force spring to the rack such that the constant-force spring provides tension that holds the head-mounted display against the user's face when the user is wearing the head-mounted display.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate examples of apparatuses, systems, and methods according to various embodiments described herein. These drawings are a part of the specification and, together with the following description, demonstrate and explain various principles of the instant disclosure. Throughout the drawings, identical reference characters and descriptions indicate similar, but not necessarily identical, elements.

Figure 1:
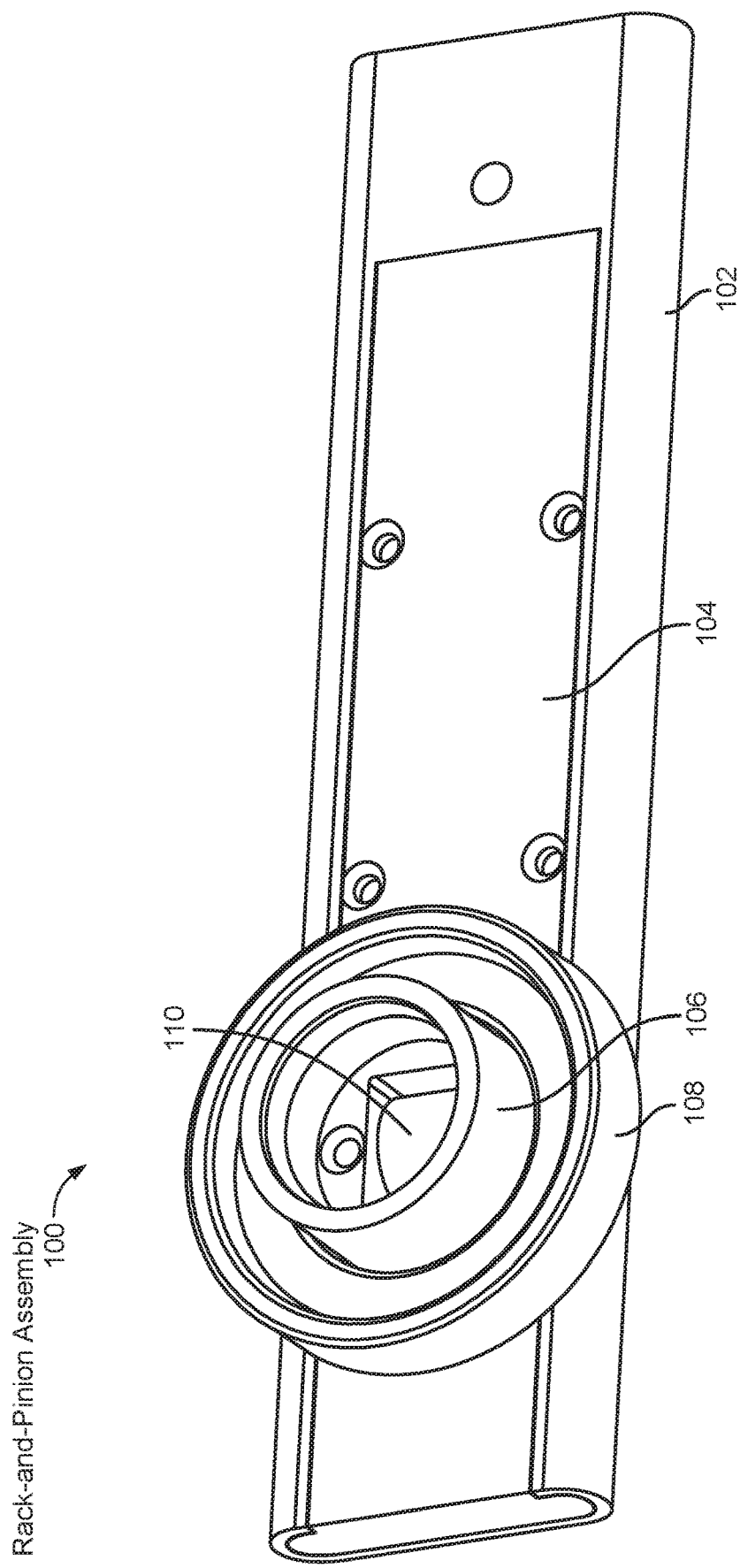
FIG. 1 is a perspective view of a rack-and-pinion assembly for adjusting a strap of a head-mounted display.

While the exemplary embodiments described herein are susceptible to various modifications and alternative forms, specific embodiments have been shown by way of example in the drawings and will be described in detail herein. However, the elements, configurations, and steps shown in the drawings are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The disclosure provided herein describes and illustrates numerous exemplary rack-and-pinion assemblies for adjusting head-mounted-display straps. As will be explained in greater detail below, these rack-and-pinion assemblies may be connected to a head-mounted display and coupled to a strap that holds the head-mounted display against a user's head. The strap adjustment systems disclosed herein may provide various features and advantages over conventional strap systems by using a pinion to adjust the movement of a rack along a slide such that the strap may be adjusted for users with different head sizes. For example, the pinion may couple with the slide to provide an easily adjustable telescoping movement of the rack relative to the slide (or the slide relative to the rack). The rack-and-pinion assembly may also include a gear train that enables adjustments to be made to the telescoping assembly that provide an extended range of the telescoping movement. Furthermore, the rack-and pinion assembly may incorporate a constant-force spring to provide a tension that holds the position of the strap on a head-mounted display while a user wears the head-mounted display. As discussed in greater detail below, these and other disclosed embodiments, whether used alone or in combination, may help optimize the immersiveness, enjoyability, and/or utility of a virtual- or augmented-reality experience.

The following will provide, with reference to FIGS. 1-13, examples of apparatuses for adjusting head-mounted-display systems. In addition, the discussion associated with FIGS. 14-16 will provide examples of head-mounted-display systems that include the apparatuses illustrated in FIGS. 1-13. Finally, the discussion corresponding to FIGS. 17-19 will provide examples of methods for manufacturing, assembling, configuring, and/or using the head-mounted-display adjustment mechanisms presented herein.

Figure 2:
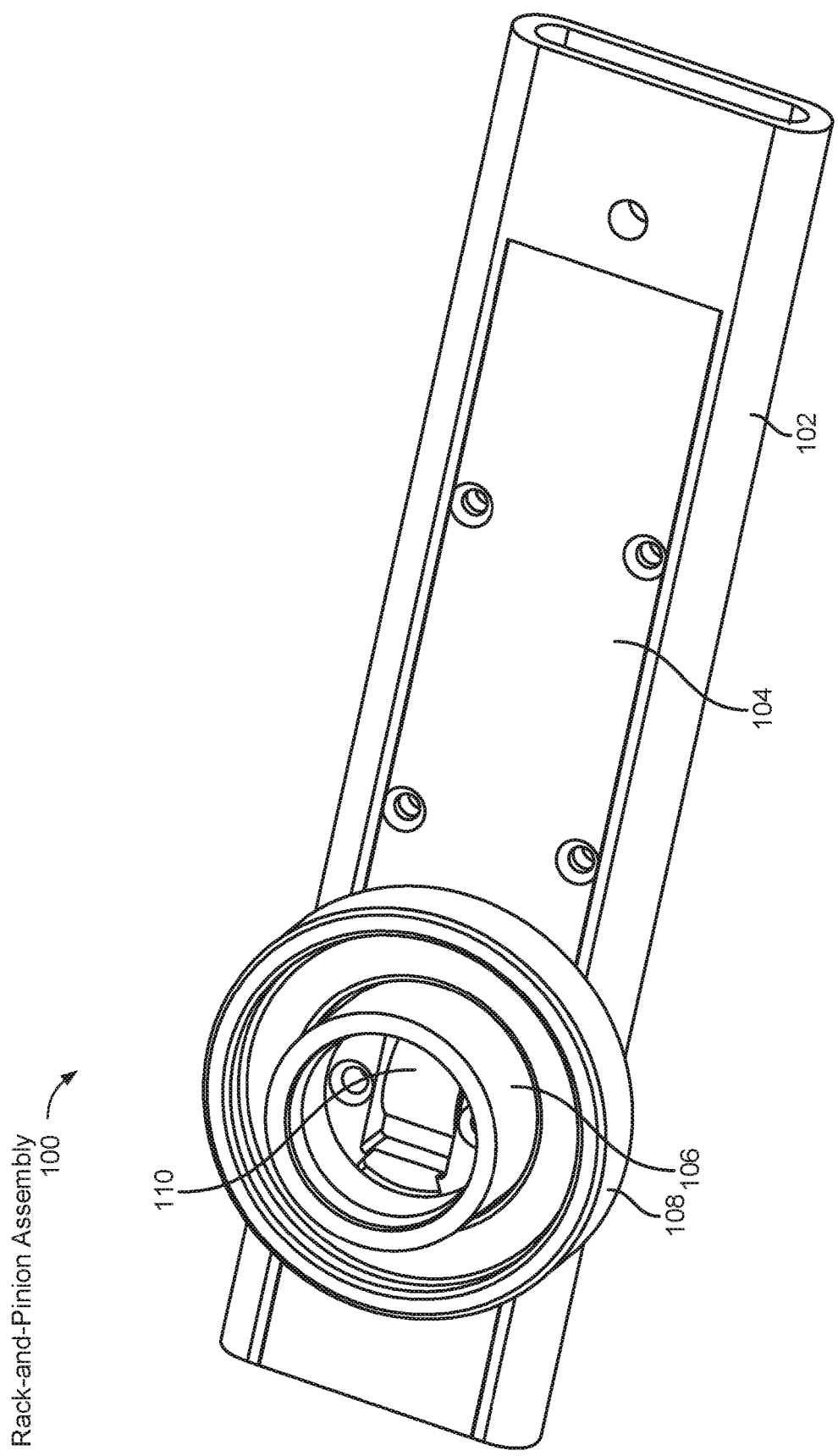
FIG. 2 is an alternative view of the rack-and-pinion assembly shown in FIG. 1.

FIG. 1 and FIG. 2 illustrate different perspective views of a rack-and-pinion assembly 100 for adjusting a head-mounted-display strap. Rack-and-pinion assembly 100 may represent a part of a head-mounted-display adjustment apparatus that includes a strap with a distal section coupled to a distal area of a head-mounted display. As used herein, the term "head-mounted display" generally refers to any type or form of display apparatus or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

In the examples of FIG. 1 and FIG. 2, rack-and-pinion assembly 100 may include a slide 104 that may be attached to a proximal area of a head-mounted display. For example, the entire length of slide 104 may be coupled to the proximal area of the head-mounted display. Slide 104 may also be coupled to the head-mounted display via a coupling mechanism 106, which may allow slide 104 to pivot relative to the head-mounted display.

In some examples, rack-and-pinion assembly 100 may include a rack 102 that may be coupled to a proximal section of a strap and that has a plurality of teeth in mesh with a pinion such that rotation of the pinion repositions rack 102 relative to the head-mounted display, which may adjust an area between the strap and the head-mounted display. In these examples, one end or a portion of rack 102 may be coupled to the strap, such as by attaching the strap to a right-hand end of rack 102 in FIG. 2.

In one embodiment, rack-and-pinion assembly 100 may further include a graspable knob 108 coupled to the pinion such that rotation of knob 108 rotates the pinion. As used herein, the term "graspable" generally refers to an element being shaped, dimensioned, sized, and/or otherwise configured in a manner that enables the element to be engaged, moved, or clasped by human fingers and/or thumbs. In this embodiment, knob 108 may be coupled to the pinion to provide an ergonomic interface for a user to rotate the pinion. For example, the pinion may be a gear or similar apparatus that may not be easily rotated by hand, and knob 108 may be a larger apparatus suitable for manual rotation by a user. Furthermore, in the above embodiment, graspable knob 108 may be configured to adjust a distance of the head-mounted display to a user's face when a user is wearing the head-mounted display. For example, knob 108 may adjust the strap of the head-mounted display before the user wears the head-mounted display. Knob 108 may then additionally adjust the strap after the user puts on the head-mounted display.

In further embodiments, rack-and-pinion assembly 100 may include a constant-force spring 110 that includes a ribbon with a rolled portion and a protracted section that extends from the rolled portion. In these embodiments, constant-force spring 110 may provide a tension holding the head-mounted display against the user's face when the user is wearing the head-mounted display. In the above example, after the user makes additional adjustments to the strap while wearing the head-mounted display, constant-force spring 110 may provide the tension to hold the position of the strap relative to the head-mounted display in place. The tension provided by constant-force spring 110 may include a restoring force that is, within an elastic limit of constant-force spring 110, substantially disproportional to deflection of constant-force spring 110.

The term "elastic limit," as used herein, generally refers to the maximum extent or distance that a spring may be stretched without permanent alternation. In other words, the elastic limit may be the maximum deflection of a spring in which the spring will retain its original length after force is withdrawn. The term "deflection," as used herein, generally refers to the movement or displacement of a spring, either by applying or removing force from it. The term "restoring force," as used herein, generally refers to any force that acts to restore a spring to equilibrium or rest. Thus, the restoring force of a spring could be said to act in opposition to any displacement of the spring.

In these embodiments, a spring whose restoring force is substantially disproportional to its deflection may be any spring that does not follow or approximately follow (i.e., within generally accepted manufacturing tolerances) Hooke's law. Hooke's law states that a deformation of an elastic object (e.g., a spring) is proportional to the stress applied to it, and traditional compression and expansion springs are examples of springs that generally obey Hooke's law.

In contrast, constant-force spring 110 may be a spring that maintains uniform or near-uniform (i.e., within generally accepted manufacturing tolerances) force exertion over a range of working deflection and may not obey Hooke's law. In other words, constant-force spring 110 may exert at least approximately constant (i.e., near-constant to constant) force over a working deflection of constant-force spring 110.

Furthermore, constant-force spring 110 may be configured in any fashion that causes constant-force spring 110 to function in a manner that ignores Hooke's law. In these embodiments, constant-force spring 110 may be constructed as a rolled ribbon of spring steel or any other pre-stressed material that is relaxed when fully rolled up. In other words, constant-force spring 110 may be a straight, thin-walled strip of resilient material with a curved cross-section. In these types of constant-force springs, the restoring force may primarily be a result of an extended portion of the ribbon that is nearest to the roll. The restoring force is nearly constant in springs made from rolled ribbon because the geometry of the portion of the spring that creates the restoring force remains nearly constant as the spring unrolls.

Figure 3:
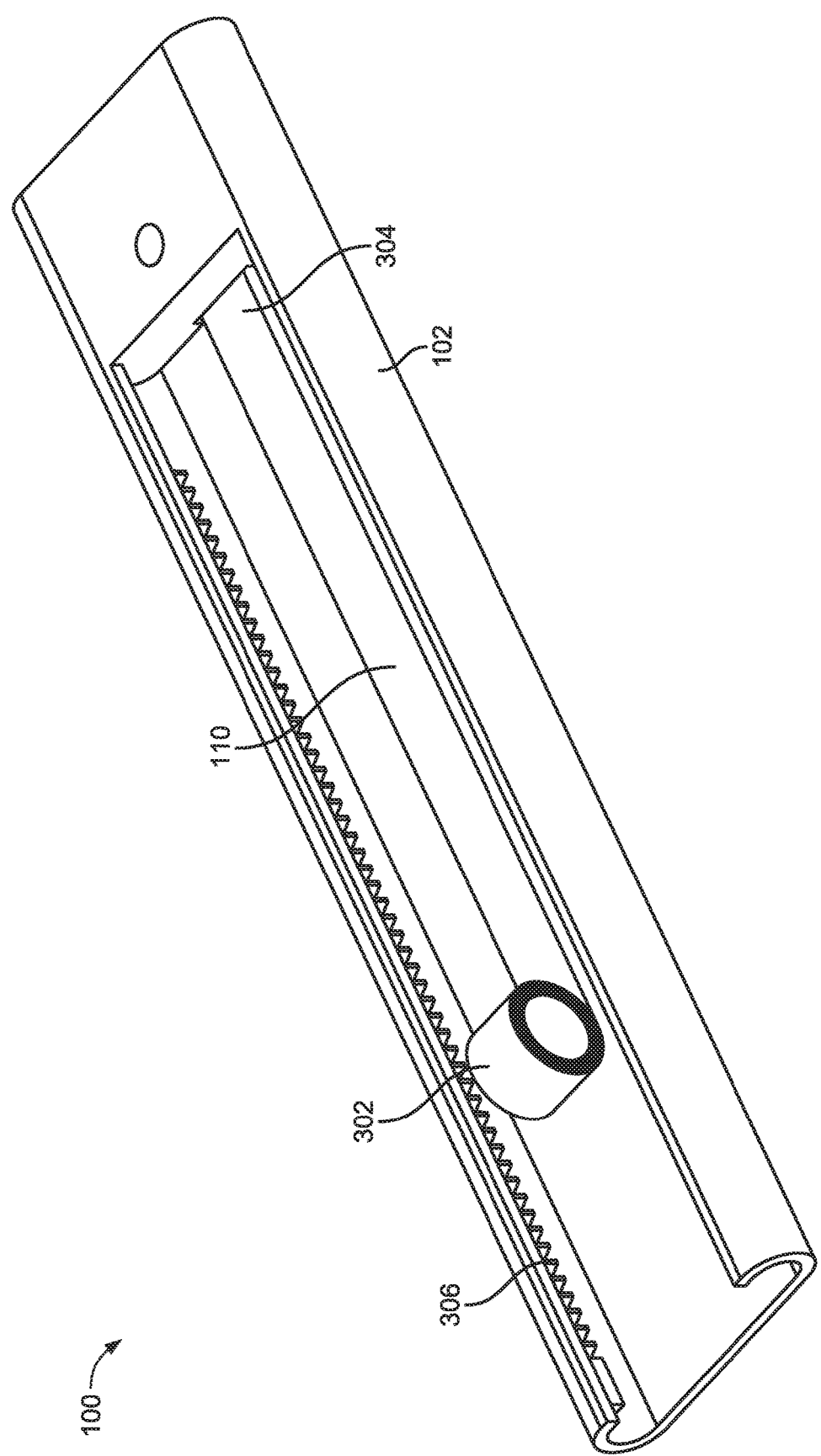
FIG. 3 is a perspective view of a constant-force spring coupled to a rack of a rack-and-pinion assembly.

FIGS. 3-13 illustrate additional details of rack-and-pinion assembly 100. Specifically, FIG. 3 illustrates a plurality of teeth 306 in rack 102. FIG. 3 also illustrates constant spring force 110 with a rolled portion 302 and a protracted section 304. In this example, protracted section 304 may be anchored to rack 102. Thus, one end (e.g., the outside end) of constant spring force 110 may remain in a fixed position on rack 102 as the strap of the head-mounted display is adjusted.

Figure 4:
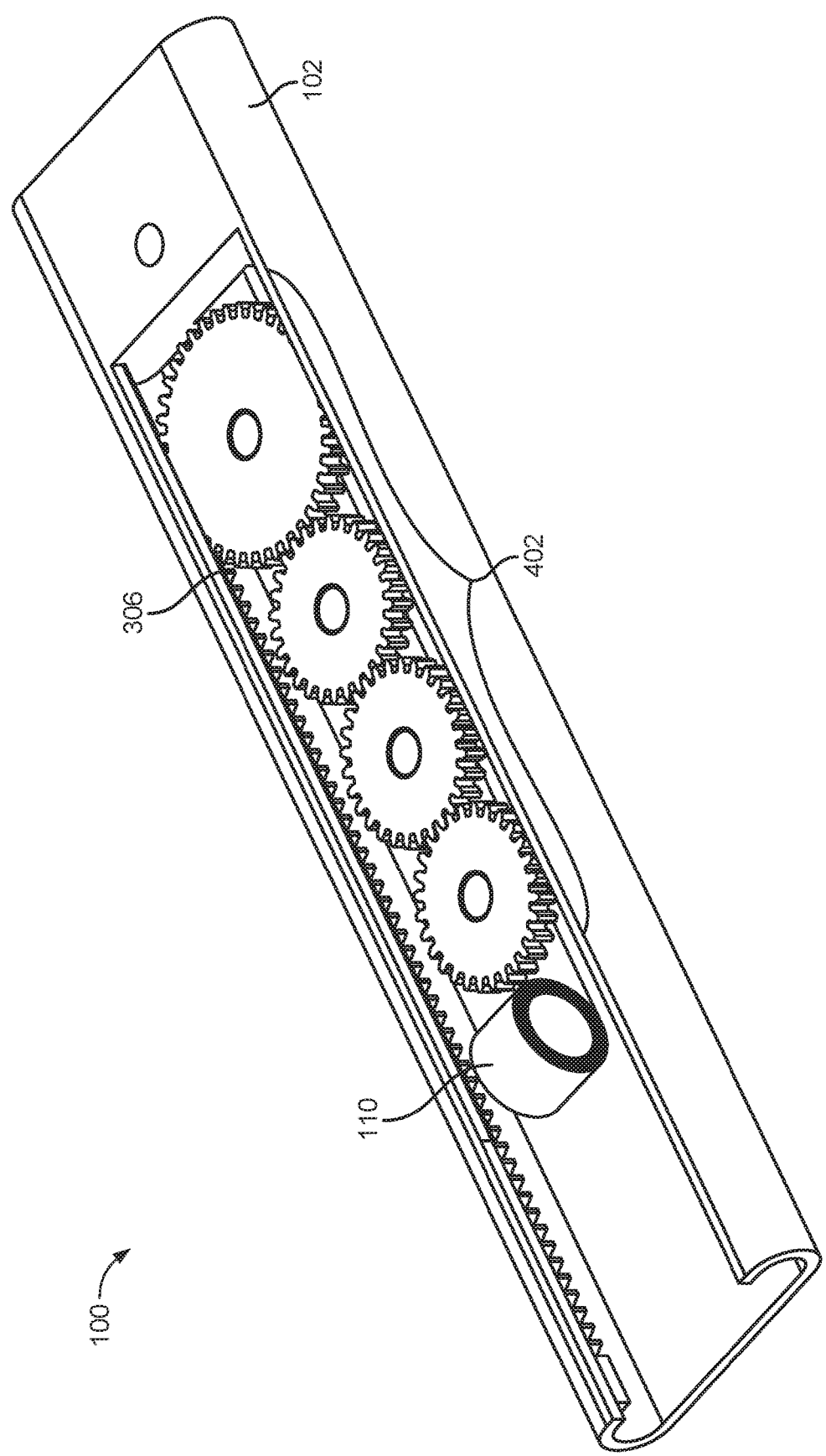
FIG. 4 is a perspective view of a gear train in mesh with a rack of a rack-and-pinion assembly.

In some embodiments, rack-and-pinion assembly 100 may include a gear train that has a set of gears. As illustrated in FIG. 4, rack-and-pinion assembly 100 may include a gear train 402 in mesh with teeth 306 of rack 102. In this example, one or more gears in gear train 402, which may include four gears, may not be in mesh with teeth 306 of rack 102 (e.g., gear train 402 may include only a single gear in mesh with rack 102). Also, while FIGS. 4 and 5 show four gears in gear train 402, gear train 402 may include any other suitable number of gears (e.g., a single gear, two gears, three gears, more than four gears, etc.).

Figure 5:
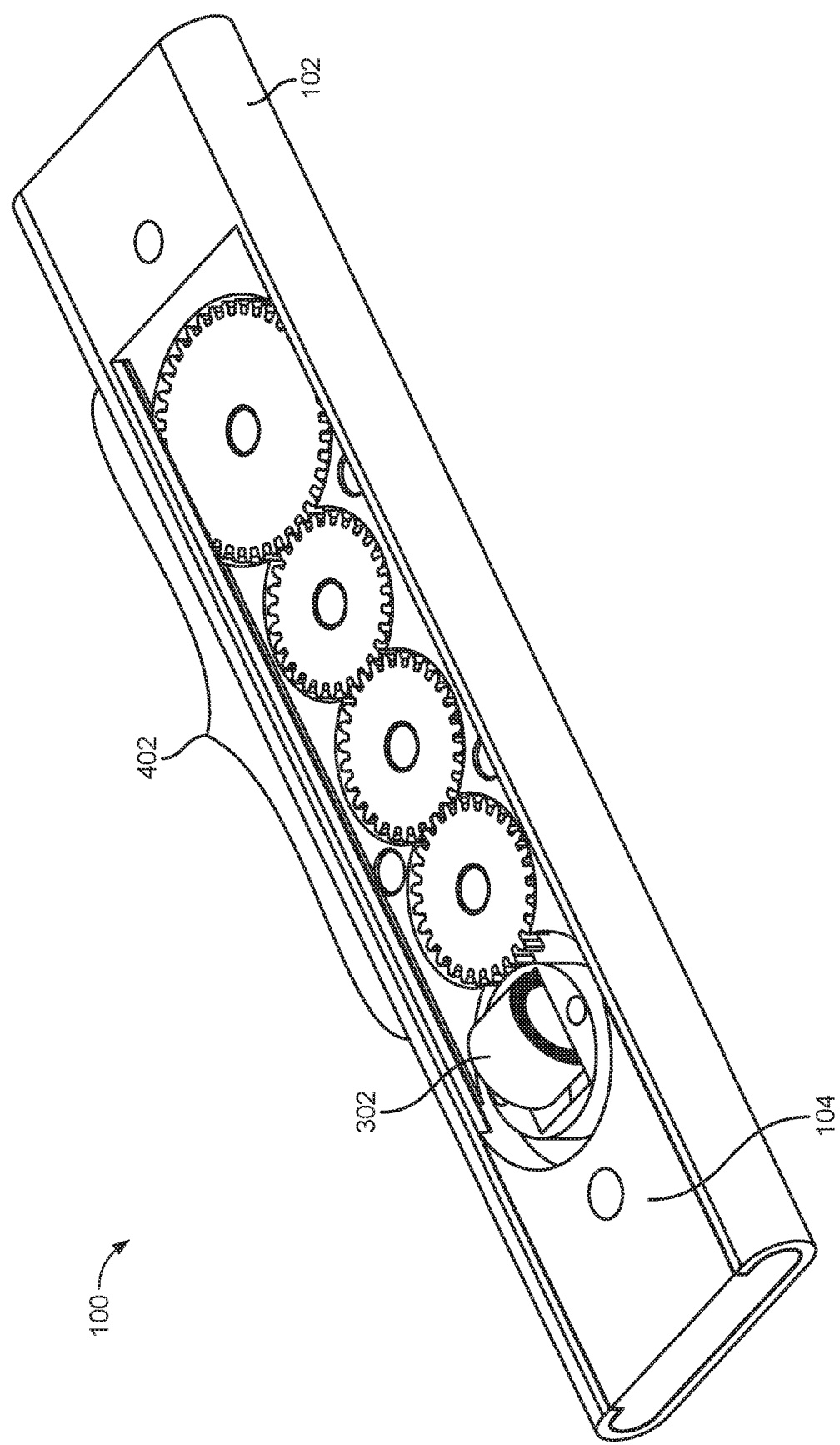
FIG. 5 is a perspective view of a slide of a rack-and-pinion assembly housing a gear train and a constant-force spring.

In the example of FIG. 5, slide 104 is illustrated in addition to the other elements shown in FIG. 4. In some examples, gear train 402 may be housed by slide 104. In additional examples, rolled portion 302 of the ribbon of constant-force spring 110 may be housed by slide 104 such that, when rack 102 moves away from slide 104, the ribbon unrolls and the strap extends away from the head-mounted display.

Figure 6:
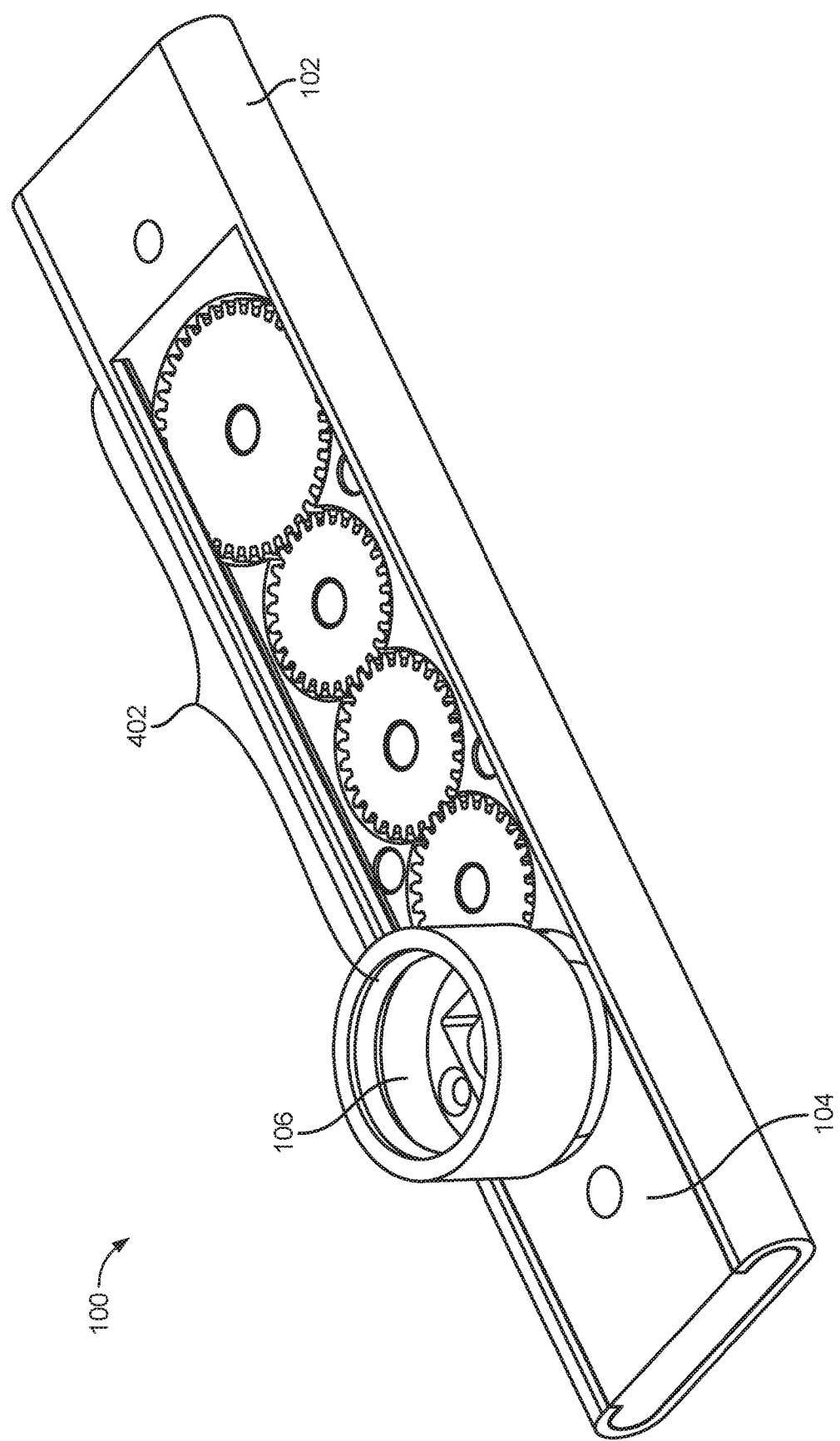
FIG. 6 is a perspective view of a coupling mechanism for a rack-and-pinion assembly.
Figure 7:
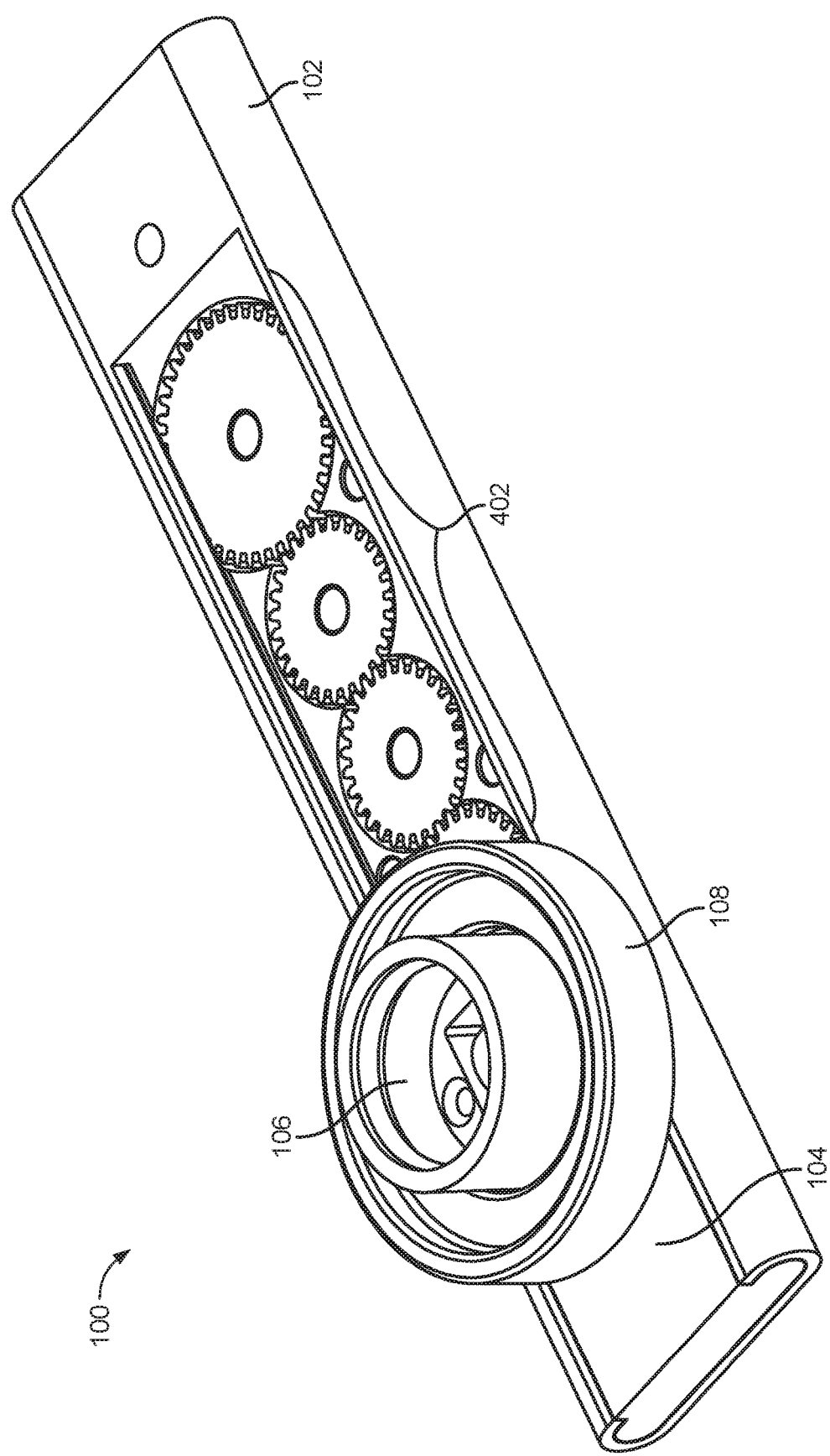
FIG. 7 is a perspective view of a graspable knob coupled to a pinion of a rack-and-pinion assembly.
Figure 8:
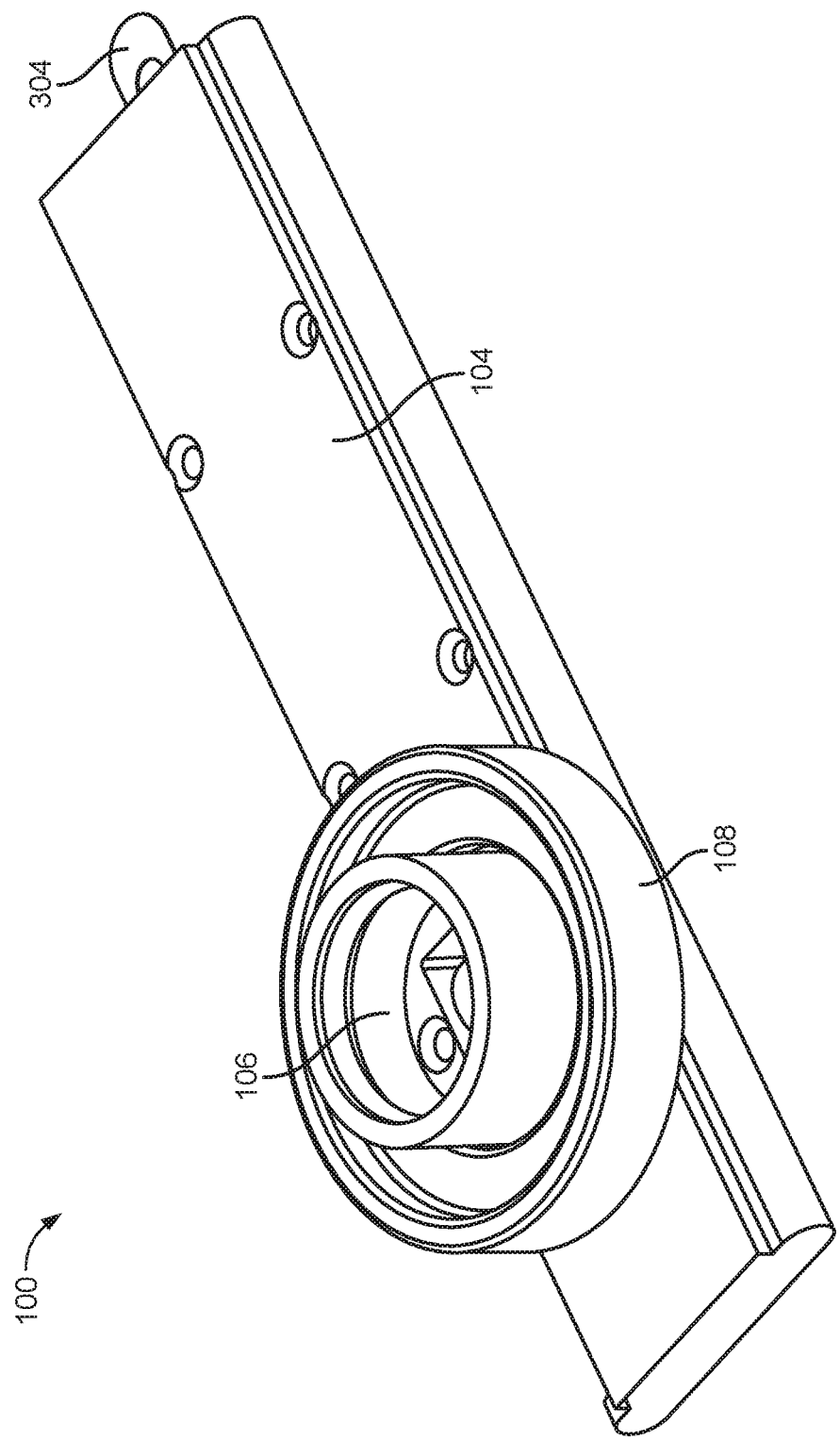
FIG. 8 is a perspective view of a knob coupled to a slide.

As illustrated in FIGS. 6-8, rack-and-pinion assembly 100 may include a coupling mechanism 106 and a knob 108 that may be coupled to the pinion to rotate the pinion and to drive gear train 402. As shown in FIG. 8 and previous illustrations, slide 104 may enclose gear train 402 and rolled portion 302 of constant-force spring 110. Furthermore, protracted section 304 of constant-force spring 110 may extend past slide 104 when rack 102 is moved away from a head-mounted display. In this example, the pinion may be coupled to slide 104 and may be stationary relative to slide 104 when rack 102 moves relative to slide 104.

Figure 9:
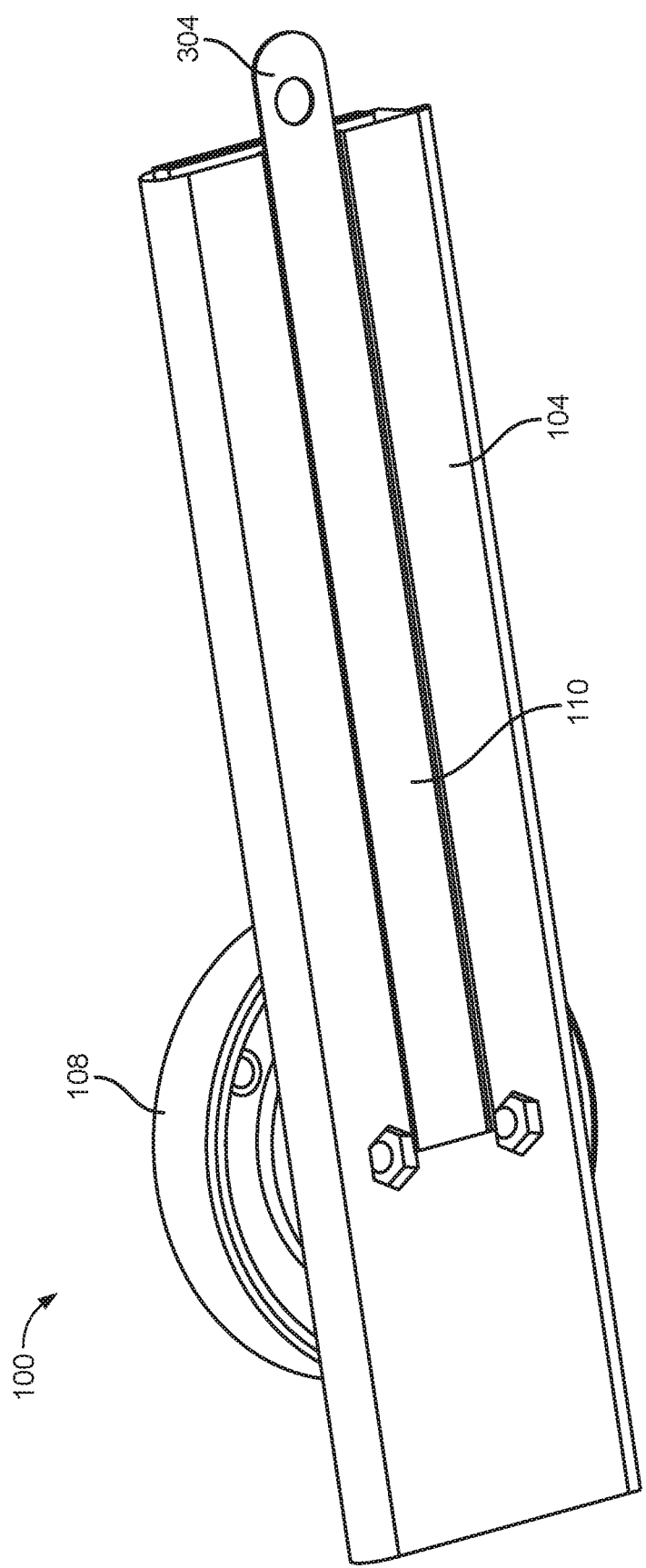
FIG. 9 is an alternative view of the knob coupled to the slide shown in FIG. 8.
Figure 10:
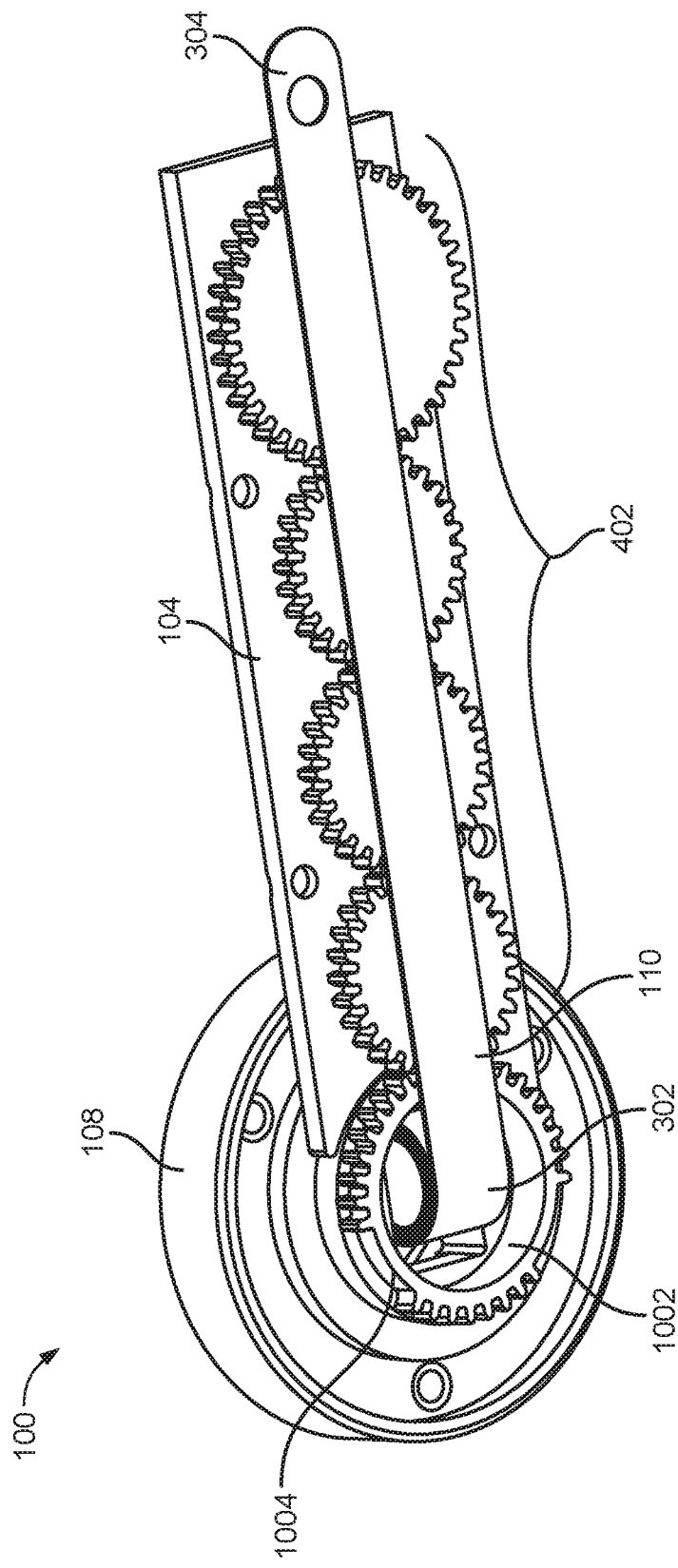
FIG. 10 is a perspective view of a pinion in mesh with a gear train in a rack-and-pinion assembly.
Figure 11:
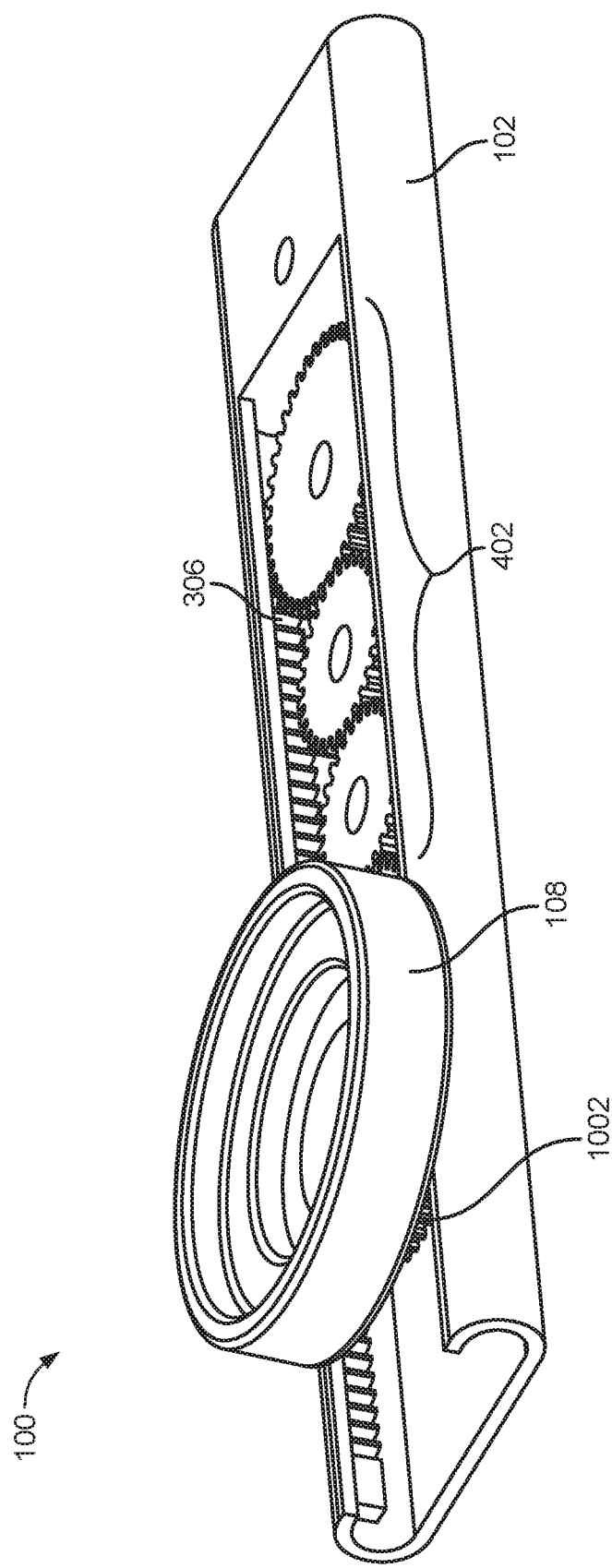
FIG. 11 is a perspective view of a pinion and a gear train in mesh with a rack of a rack-and-pinion assembly.

FIGS. 9-11 illustrate additional views of rack-and-pinion assembly 100. In the example of FIG. 9, protracted section 304 of constant-force spring 110 is shown to run along slide 104 and to extend past the end of slide 104. FIG. 10 illustrates additional details of rack-and-pinion assembly 100 from the same perspective. FIG. 10 illustrates a pinion 1002 that can be rotatably coupled to a proximal area of the head-mounted display in a manner that holds the head-mounted display against a user's face when a user is wearing the head-mounted display. Pinion 1002 may be in mesh with gear train 402 such that rotation of knob 108 drives gear train 402. Although illustrated as separate entities, gear train 402 and pinion 1002 may, in alternate embodiments, be a single gear in mesh with rack 102. In these examples, pinion 1002 and knob 108 may represent two distinct portions of rack-and-pinion assembly 100. For example, pinion 1002 may represent a main gear driving gear, and knob 108 may represent an additional element allowing for rotation of pinion 1002.

In the example of FIG. 10, pinion 1002 may also include one or more gaps 1004 in the teeth of the gear (e.g., flat sections on the gear portion of pinion 1002) such that the position of rack 102 relative to slide 104 may be freely adjusted without turning pinion 1002. For example, while putting on or removing the head-mounted display, the user may apply direct force to the head-mounted display and/or the strap to make larger adjustments without turning knob 108. Gaps 1004 in the teeth of pinion 1002 may allow gear train 402 to freely move along rack 102, which may then allow adjustment of the strap relative to the head-mounted display. After the head-mounted display is on the user's head, the user may make smaller calibrations by turning knob 108 such that the teeth of pinion 1002 engage with the teeth of a gear in gear train 402.

Furthermore, as shown in the example illustrated in FIG. 11, knob 108 and pinion 1002 may be combined into a single part (or manufactured as a single, integral part) with a gear in mesh with gear train 402 and/or teeth 306 of rack 102. As shown in these illustrations, teeth 306 may include a stop at one end to prevent rack 102 from detaching from slide 104, pinion 1002, and/or gear train 402.

Figure 12:
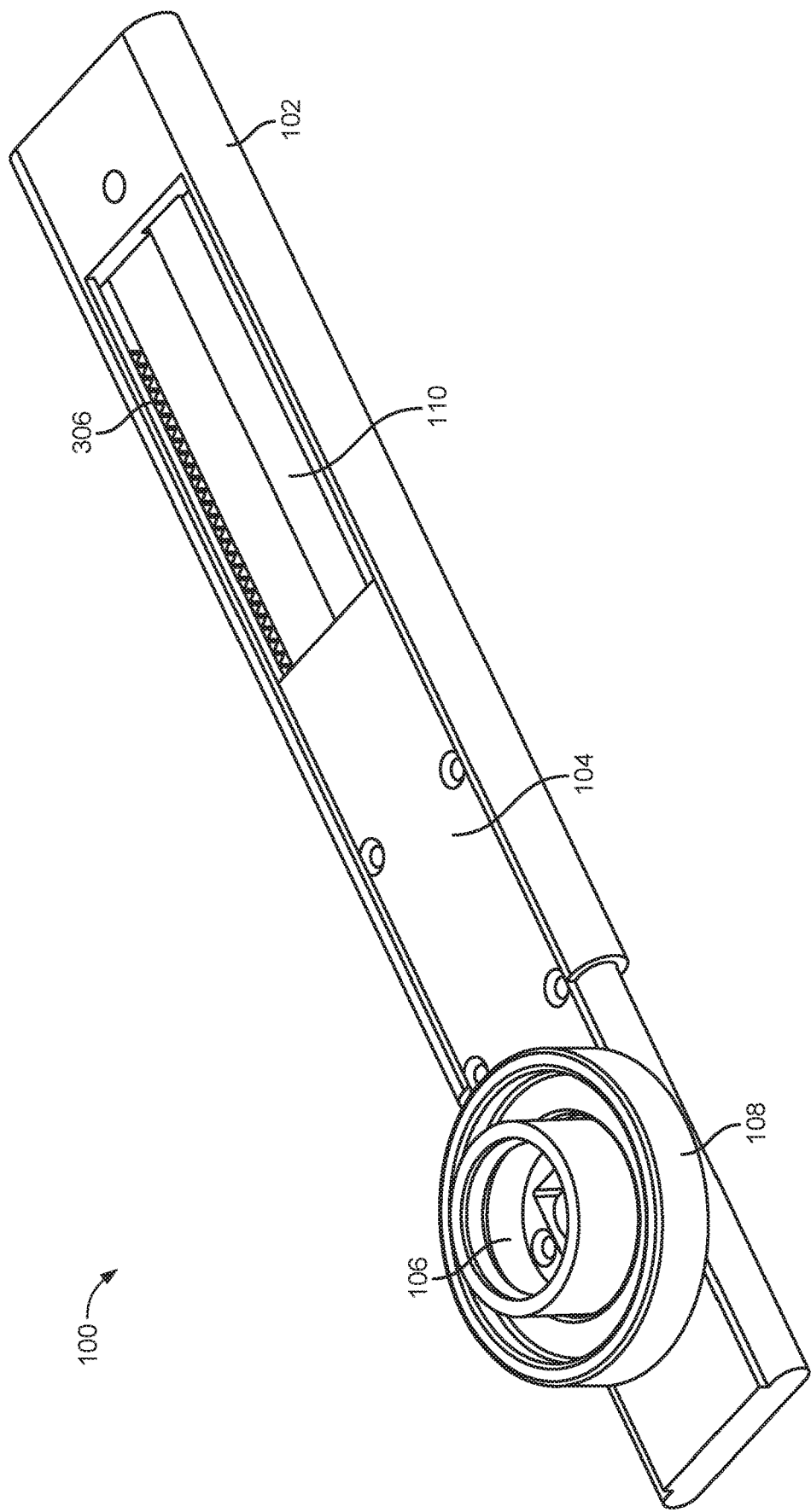
FIG. 12 is a perspective view of an expanded rack-and-pinion assembly.
Figure 13:
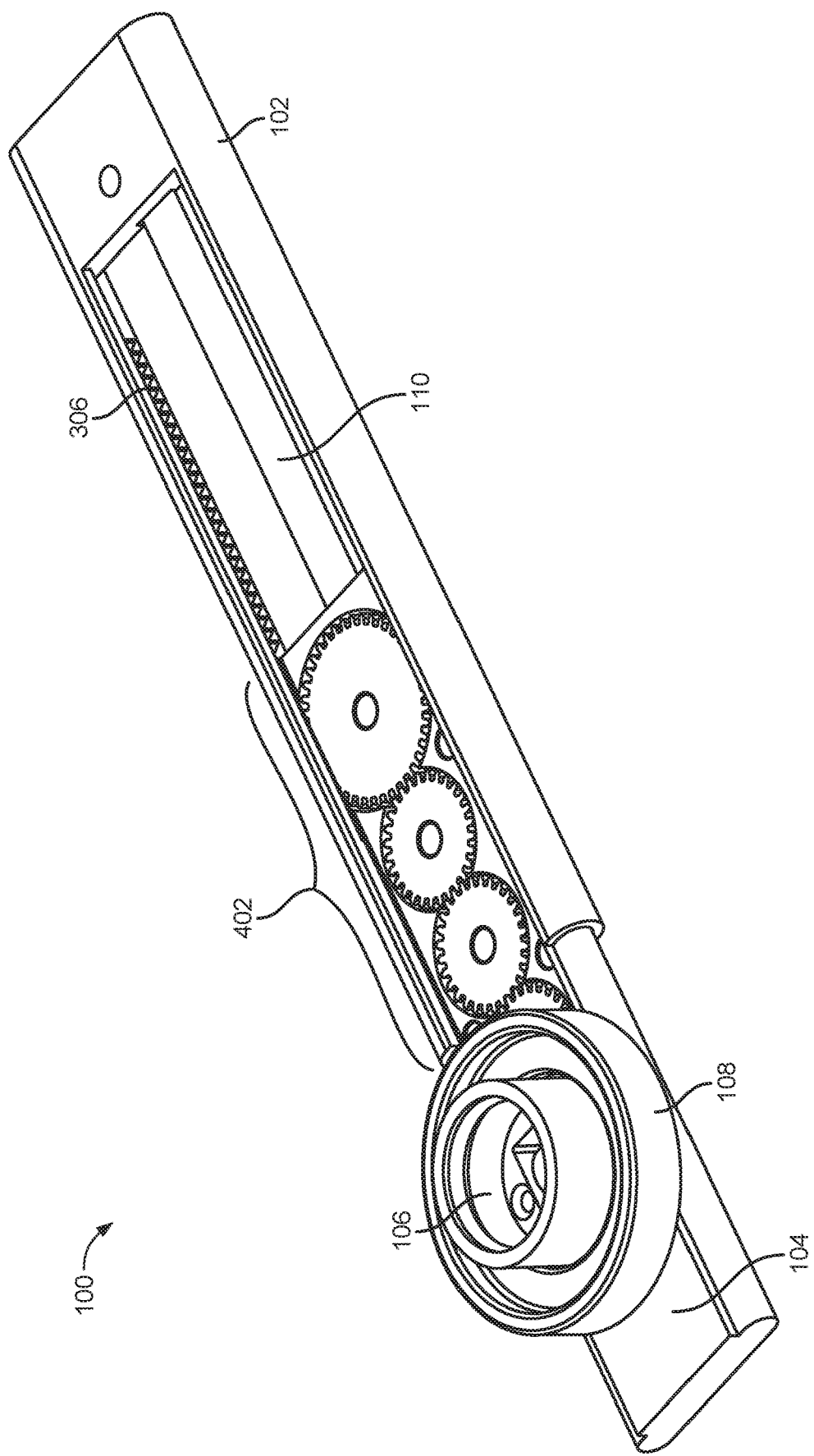
FIG. 13 is a perspective view of a gear train in an expanded rack-and-pinion assembly.

FIGS. 12 and 13 illustrate rack-and-pinion assembly 100 with rack 102 extended relative to slide 104. As shown in FIG. 12, rack 102 may telescope in relation to slide 104 to lengthen or shorten rack-and-pinion assembly 100. In this example, constant-force spring 110 may unroll or roll to accommodate the position of rack 102 relative to slide 104. Furthermore, as shown in FIG. 13, the gears of gear train 402 may provide a range of motion of rack 102 that enables rack 102 to extend beyond pinion 1002 and/or knob 108. In other words, gear train 402 may increase lateral movement of rack 102 along slide 104 and away from pinion 1002, coupling mechanism 106, and knob 108. Although illustrated as a linear set of gears, gear train 402 may represent any other suitable configuration of one or more gears that extend the telescoping range of rack 102 with respect to slide 104.

Figure 14:
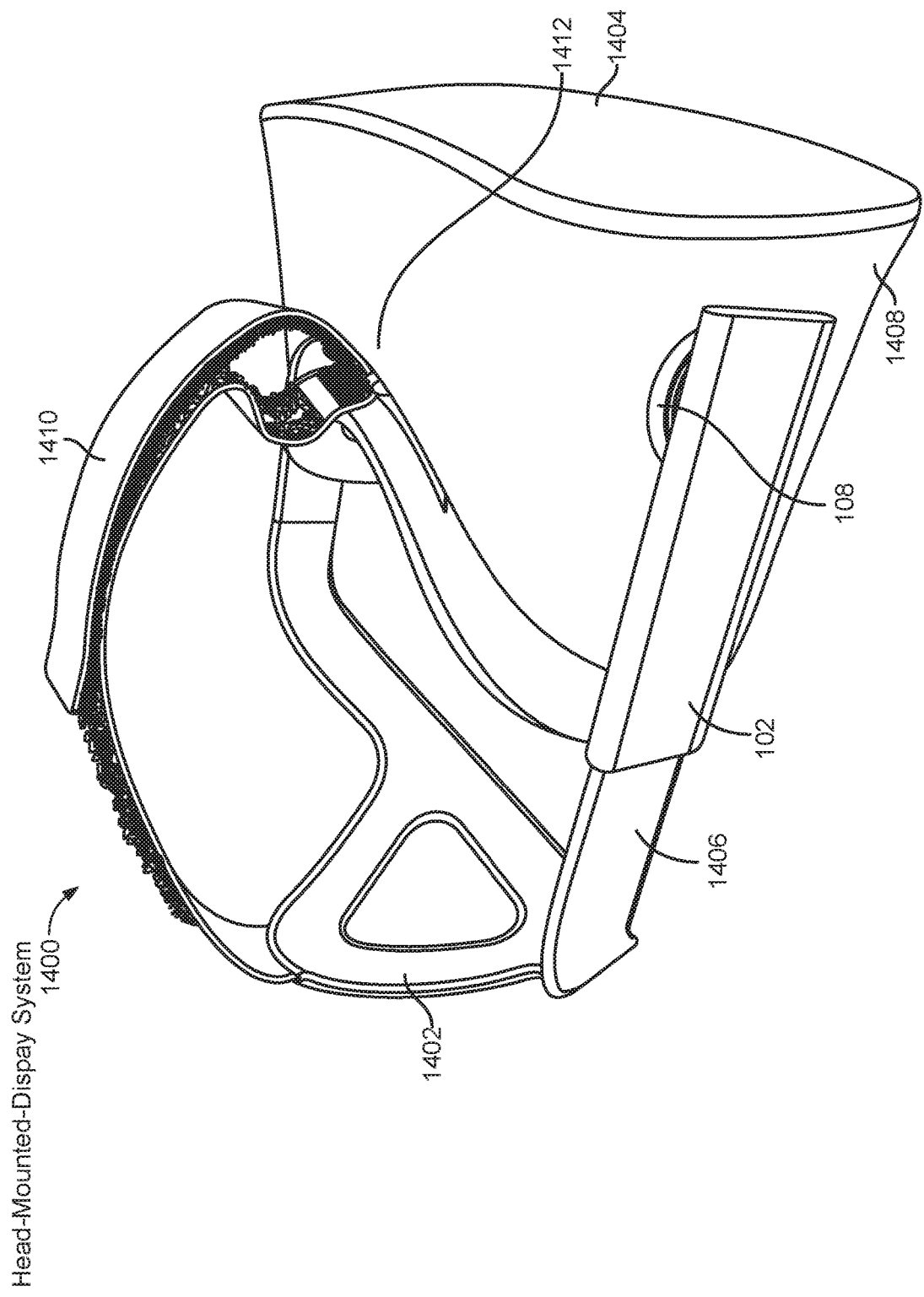
FIG. 14 is a perspective view of a system with a rack-and-pinion assembly coupled to a head-mounted display.
Figure 15:
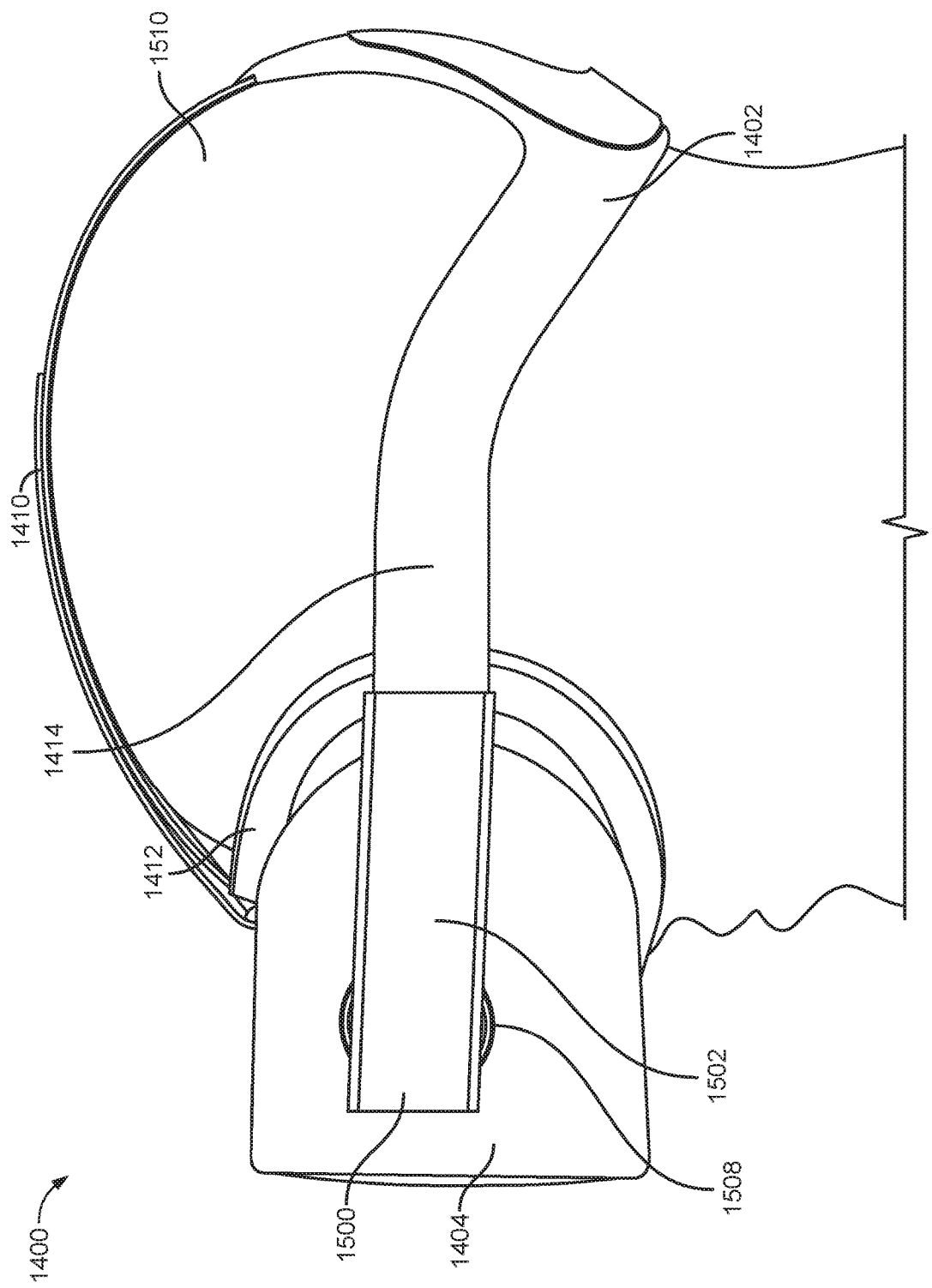
FIG. 15 is a side view of a head-mounted-display system positioned on a user's head.
Figure 16:
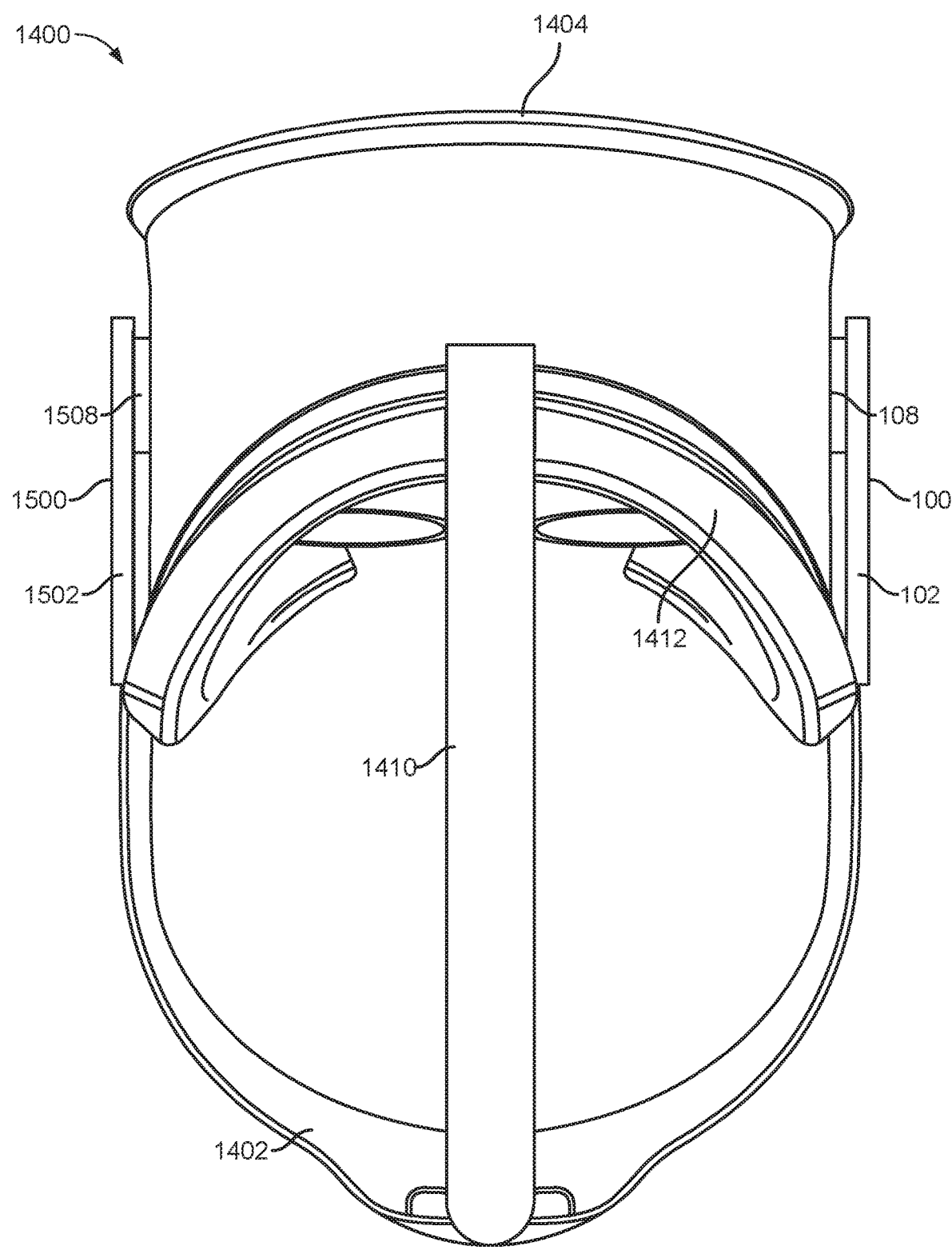
FIG. 16 is a top view of multiple rack-and-pinion assemblies coupled to a head-mounted display.

FIGS. 14-16 illustrate a head-mounted-display system 1400 that incorporates one or more rack-and-pinion assemblies. In the example of FIG. 14, head-mounted-display system 1400 may include a head-mounted display 1404, a strap 1402 with a distal section coupled to a distal area of head-mounted display 1404 (e.g., a top area or left-hand area of head-mounted display 1404), and a rack-and-pinion assembly (e.g., rack-and-pinion assembly 100) coupled to a proximal section 1406 of strap 1402 and a proximal area 1408 of head-mounted display 1404 such that, when a user is wearing head-mounted display 1404, strap 1402 holds head-mounted display 1404 against the user's face. As shown, the distal section of strap 1402 may be positioned at the back of a user's head and/or a side of the user's head opposite the side near proximal area 1408 of head-mounted display 1404.

Although not illustrated in FIG. 14, coupling mechanism 106 may couple slide 104 to head-mounted display 1404 by being attached to head-mounted display 1404 (e.g., as a pivot point connected to display 1404). Furthermore, in this example, strap 1402 may include a medial section 1410 coupled to a top section 1412 of head-mounted display 1404 that is dimensioned to be positioned at a forehead of the user. As illustrated, medial section 1410 may provide additional adjustment for strap 1402.

In the examples of FIG. 15 and FIG. 16, a distal section 1414 of strap 1402 may be coupled to the distal area of head-mounted display 1404 via an additional rack-and-pinion assembly 1500 that includes an additional pinion rotatably coupled to head-mounted display 1404 and an additional rack 1502 in mesh with additional the pinion such that rotation of the additional pinion repositions additional rack 1502 relative to head-mounted display 1404. In these examples, repositioning rack 1502 may also adjust the area between strap 1402 and head-mounted display 1404.

In the above examples, rack-and-pinion assembly 100 may further include graspable knob 108 coupled to pinion 1002 such that rotation of knob 108 rotates pinion 1002 and constant-force spring 110 that provides a tension holding head-mounted display 1404 against the face of a user 1510 of FIG. 15 when user 1510 is wearing head-mounted display 1404. Similarly, additional rack-and-pinion assembly 1500 may further include an additional graspable knob 1508 coupled to the additional pinion such that rotation of additional knob 1508 rotates the additional pinion and an additional constant-force spring that provides an additional tension holding head-mounted display 1404 against the user's face when user 1510 is wearing head-mounted display 1404.

In some embodiments, rack-and-pinion assembly 100 may be connected to a first section of head-mounted display 1404 that is dimensioned to be positioned at a right side of the user's head, and additional rack-and-pinion assembly 1500 may be connected to distal section 1414 of head-mounted display 1404 that is dimensioned to be positioned at a left side of the user's head. For example, as shown in FIG. 16, a top view of head-mounted-display system 1400 illustrates the front of head-mounted display 1404 at the top of the illustration. In this example, rack-and-pinion assembly 100 may be located to the right of head-mounted display 1404, and additional rack-and-pinion assembly 1500 may be located to the left of head-mounted display 1404.

In the above embodiments, rotation of knob 108 to reposition rack 102 relative to head-mounted display 1404 may adjust the area between strap 1402 and head-mounted display 1404 separately from rotation of additional knob 1508 to reposition additional rack 1502 relative to head-mounted display 1404. In other words, user 1510 may adjust the left and right sides of head-mounted-display system 1400 independent of each other to provide an optimal fit.

Furthermore, as noted previously, constant-force spring 110 of rack-and-pinion assembly 100 may include a ribbon with rolled portion 302 that may be housed by slide 104 coupled to rack 102 such that, when rack 102 moves away from slide 104, the ribbon unrolls and strap 1402 extends away from head-mounted display 1404. Constant-force spring 110 may also include protracted section 304 anchored to rack 102 that extends from rolled portion 302. Similarly, the additional constant-force spring of additional rack-and-pinion assembly 1500 may include an additional ribbon with an additional rolled portion that may be housed by an additional slide coupled to additional rack 1502 such that, when additional rack 1502 moves away from the additional slide, the additional ribbon unrolls and strap 1402 extends away from head-mounted display 1404. The additional constant-force spring may also include an additional protracted section anchored to additional rack 1502 that extends from the additional rolled portion.

In further embodiments, the tension of constant-force spring 110 may approximate the additional tension of the additional constant-force spring. In other words, the tension of both sides of head-mounted-display system 1400, as provided by rack-and-pinion assembly 100 and additional rack-and-pinion assembly 1500, may remain equal to provide a balanced fit between both sides of the user's head.

As illustrated in the examples of FIGS. 14-16, user 1510 may wear and adjust head-mounted-display system 1400 in a variety of ways. In the above examples, user 1510 may first adjust rack-and-pinion assembly 100 and/or additional rack-and-pinion assembly 1500 so that the area between strap 1402 and head-mounted display 1404 is large enough to fit over the user's head. User 1510 may then further adjust rack-and-pinion assembly 100 and/or additional rack-and-pinion assembly 1500 to reduce the area between strap 1402 and head-mounted display 1404 so that head-mounted-display system 1400 fits tightly and comfortably over the user's head. In these examples, the tension and additional tension from constant-force spring 110 and the additional constant-force spring may then hold head-mounted-display system 1400 securely in place. Further adjustments may be made using medial section 1410 or additional features that may be included in strap 1402.

Figure 17:
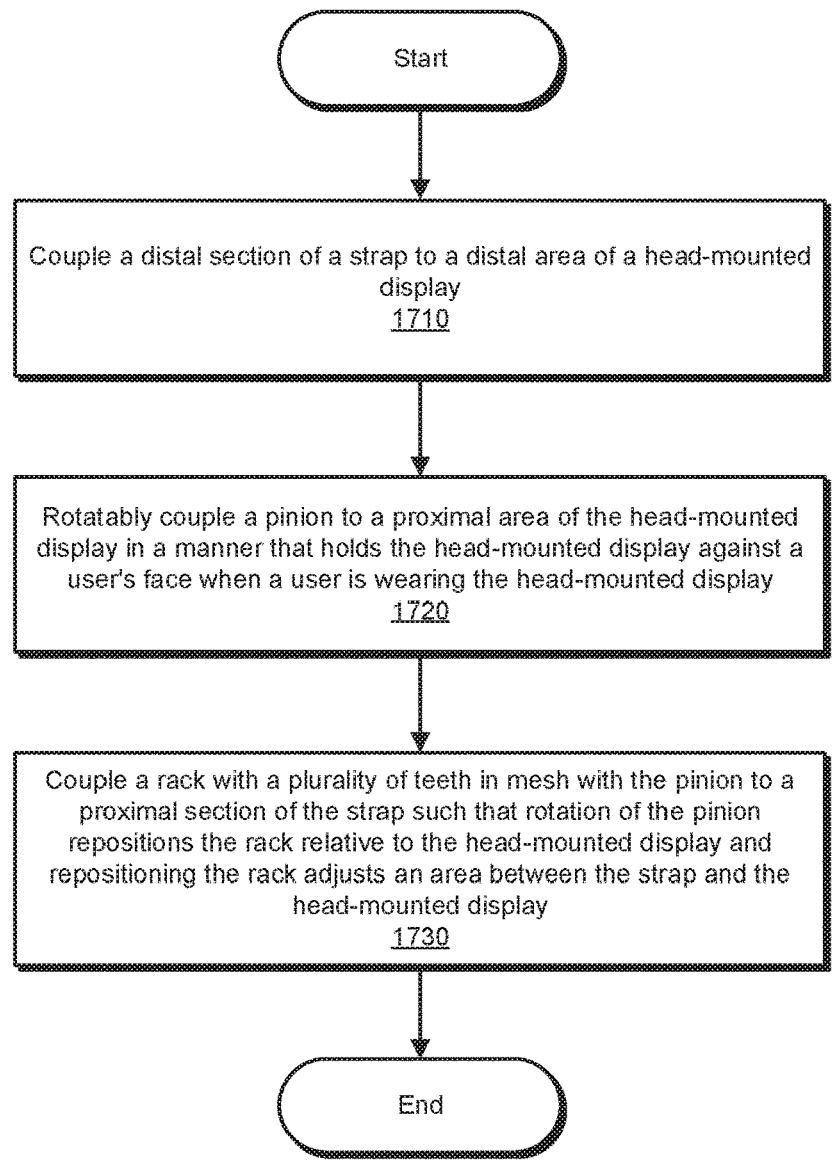
FIG. 17 is a flow diagram of a method for coupling a rack-and-pinion assembly to a head-mounted display.
Figure 18:
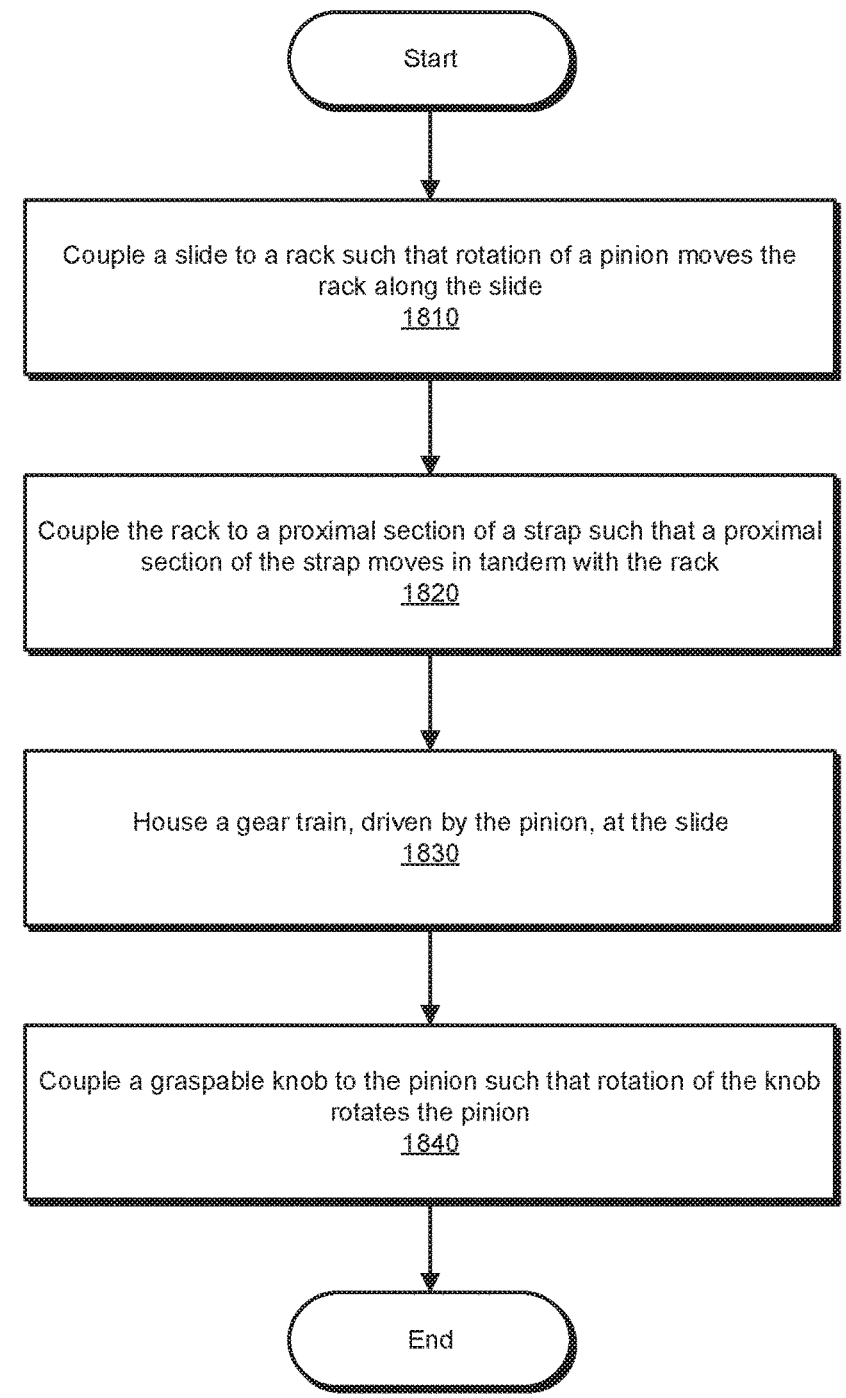
FIG. 18 is a flow diagram of a method for assembling a rack-and-pinion assembly to adjust a strap.
Figure 19:
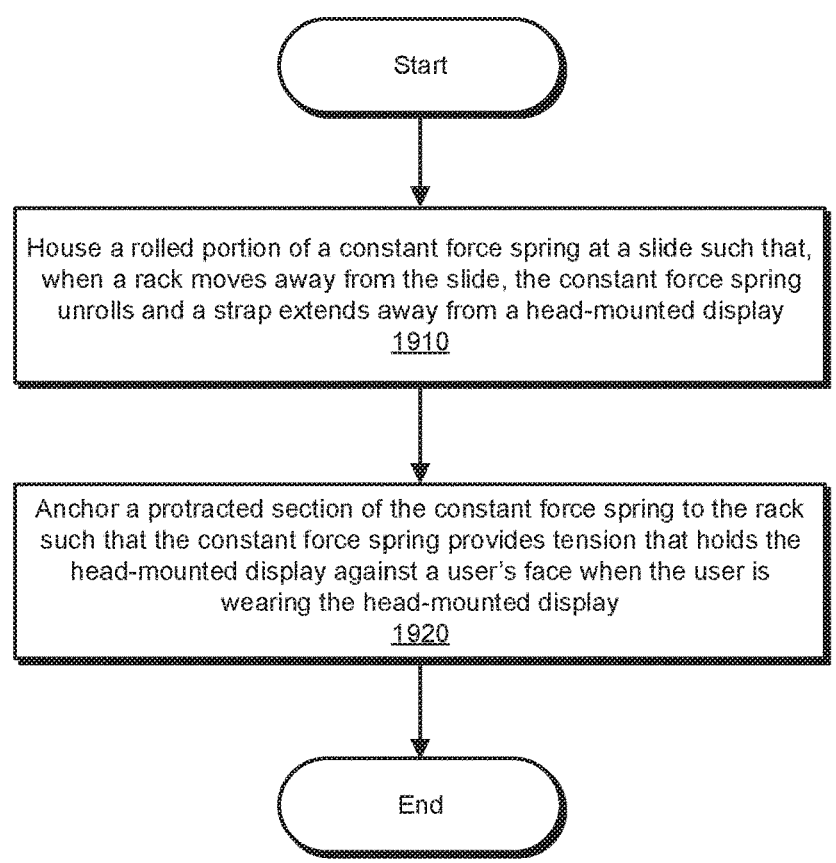
FIG. 19 is a flow diagram of a method for coupling a constant-force spring to a head-mounted display.

FIGS. 17-19 show example methods for manufacturing, assembling, using, adjusting, or otherwise configuring or creating the systems and apparatuses presented herein. The steps shown in FIGS. 17-19 may be performed by any individual and/or by any suitable type or form of manual and/or automated apparatus.

FIG. 17 is a flow diagram of an exemplary method 1700 for assembling a head-mounted-display adjustment apparatus per embodiments disclosed herein. As shown in FIG. 17, at step 1710, a distal section of a strap may be coupled to a distal area of a head-mounted display. For example, as shown in FIG. 15, strap 1402 may be coupled to head-mounted display 1404 in a variety of ways. In some embodiments, distal section 1414 of strap 1402 may be directly attached to head-mounted display 1404. Additionally or alternatively, the process of coupling strap 1402 to head-mounted display 1404 may involve multiple steps. For example, strap 1402 may be coupled to head-mounted display 1404 by being attached to rack-and-and pinion assembly 1500, and rack-and-pinion assembly 1500 may be attached to head-mounted-display 1404 (e.g., before or after strap 1402 is attached to the rack-and-pinion assembly).

At step 1720, a pinion may be rotatably coupled to a proximal area of the head-mounted display in a manner that holds the head-mounted display against a user's face when a user is wearing the head-mounted display. In the example of FIG. 14, pinion 1002 may be coupled to proximal area 1408 of head-mounted display 1404 as a part of rack-and-pinion assembly 100. User 1510 in FIG. 15 may then wear head-mounted display 1404 while pinion 1002 holds head-mounted display 1404 against the user's face. In the examples of FIG. 15 and FIG. 16, the additional pinion of additional rack-and-pinion assembly 1500 may provide a separate mechanism to hold head-mounted display 1404 against the user's face in conjunction with rack-and-pinion assembly 100. In these examples, pinion 1002 and/or the additional pinion may hold head-mounted display 1404 by tightening strap 1402 around the user's head.

At step 1730, a rack may be meshed with the pinion and coupled to a proximal section of the strap such that (1) rotation of the pinion repositions the rack relative to the head-mounted display and (2) repositioning the rack adjusts an area between the strap and the head-mounted display. As shown in FIG. 13, rack 102 may include teeth 306 that are meshed with pinion 1002. As shown in FIG. 14, rack 102 may be further coupled to proximal section 1406 of strap 1402. In these embodiments, rotation of pinion 1002 may reposition rack 102 relative to head-mounted display 1404. For example, clockwise rotation of pinion 1002 may reposition rack 102 to be further from head-mounted display 1404, and counterclockwise rotation of pinion 1002 may reposition rack 102 to be closer to head-mounted display 1404. Consequently, repositioning rack 102 may increase or decrease the area between strap 1402 and head-mounted display 1404, based on the directional rotation of pinion 1002. Additionally, a reverse directional rotation (or the same rotational direction if gearing is reversed) of the additional pinion may achieve similar repositioning of additional rack 1502.

FIG. 18 is a flow diagram of a detailed exemplary method 1800 for assembling a rack-and-pinion portion of the head-mounted-display adjustment apparatus and, specifically, coupling the pinion to the proximal area of the head-mounted display. One or more of the steps of method 1800 may be sub-steps of step 1730 in FIG. 17 and may further detail one of many ways in which step 1730 may be performed.

At step 1810, a slide may be coupled to the rack such that rotation of the pinion moves the rack along the slide. For example, as shown in FIG. 12, slide 104 may be coupled to rack 102 such that rack 102 moves along slide 104 in a telescoping motion in response the rotation of pinion 1002.

At step 1820, the rack may be coupled to the proximal section of the strap such that the proximal section of the strap moves in tandem with the rack. Rack 102 may be coupled to proximal section 1406 of strap 1402 in a variety of ways. As shown in FIG. 14, rack 102 may be coupled to proximal section 1406 of strap 1402 at one end such that rack 102 may cause strap 1402 to extend or retract. In other examples, proximal section 1406 of strap 1402 may be coupled along a side of rack 102.

At step 1830, a gear train, driven by the pinion, may be housed at the slide. For example, as shown in FIG. 5, one or more gears of gear train 402 may be assembled to rotate inside slide 104. In this example, gear train 402 may be assembled to rotate in a fixed position within slide 104.

Furthermore, at step 1840, a graspable knob may be coupled to the pinion such that rotation of the knob rotates the pinion. As shown in FIG. 10, knob 108 may be coupled to rotate in tandem with pinion 1002, such that rotation of knob 108 drives gear train 402 via pinion 1002.

FIG. 19 is a flow diagram of an exemplary method 1900 for coupling a constant-force spring to a head-mounted-display system and may represent sub-steps of one or more of the steps of method 1700 in FIG. 17. At step 1910, a rolled portion of the constant-force spring may be housed at the slide such that, when the rack moves away from the slide, the constant-force spring unrolls and the strap extends away from the head-mounted display. For example, as illustrated in FIG. 5, rolled portion 302 of constant-force spring 110 may be rotatably secured to slide 104 such that rolled portion 302 may be rolled or unrolled as rack 102 moves. Furthermore, in the example of FIG. 12, as rack 102 moves along slide 104 away from graspable knob 108, constant-force spring 110 may unroll to stretch over the additional distance from slide 104 to rack 102. As part of head-mounted-display system 1400 in FIG. 14, rack 102 may be coupled to strap 1402 such that strap 1402 extends away from head-mounted display 1404 as constant-force spring 110 unrolls.

At step 1920, a protracted section of the constant-force spring may be anchored to the rack such that the constant-force spring provides tension that holds the head-mounted display against the user's face when the user is wearing the head-mounted display. In the example of FIG. 3, protracted section 304 may be anchored to rack 102. As illustrated in FIG. 12, constant-force spring 110 may remain anchored to rack 102 as it unrolls. Therefore, the tension provided by constant-force spring 110 may securely hold head-mounted display 1404 against the user's face, as shown in FIG. 15, due to a restoring force pulling strap 1402 toward head-mounted display 1404.

While the steps of FIGS. 17-19 have been discussed using rack-and-pinion assembly 100 and additional rack-and-pinion assembly 1500 separately, the steps discussed in FIGS. 17-19 may also be implemented using rack-and-pinion assembly 100 and additional rack-and-pinion assembly 1500 jointly. For example, as shown in FIG. 16, rack-and-pinion assembly 100 may adjust strap 1402 on one side of a user's head while additional rack-and-pinion assembly 1500 may adjust strap 1402 on the other side of the user's head. In other examples, head-mounted-display system 1400 may also incorporate additional head-mounted-display adjustment apparatuses, such as medial section 1410 and/or additional rack-and-pinion assemblies, to provide further adjustment and control of strap 1402 to user 1510.

The process parameters and sequence of the steps described and/or illustrated in FIGS. 17-19 are given by way of example only and can be varied as desired. For example, while the steps illustrated and/or described herein may be shown or discussed in a particular order, these steps do not necessarily need to be performed in the order illustrated or discussed to assemble, manufacture, or use rack-and-pinion assembly 100. The various exemplary methods described and/or illustrated in FIGS. 17-19 may also omit one or more of the steps described or illustrated herein or include additional steps in addition to those disclosed.

As discussed throughout the instant disclosure, the disclosed methods, systems, and apparatuses may provide one or more advantages over traditional headset fitting mechanisms. For example, the head-mounted-display adjustment apparatuses described herein may provide increased strap adjustment ranges relative to other types of adjustment systems. As a result, these head-mounted-display adjustment apparatuses may comfortably accommodate a wider range of head sizes than other systems. As another example, by using rack-and-pinion assemblies to enable strap extension, the systems described herein may streamline adjustments that may have been needed to properly fit a traditional head-mounted display by providing a smooth and easy mechanism for adjusting strap length. Thus, switching a headset between multiple users may be much less cumbersome and time-consuming. Furthermore, some of the apparatuses discussed herein may enable a constant-force spring to exert a tension needed to securely hold the strap of a head-mounted display while a user wears the head-mounted display, thereby allowing the user to stay immersed in a virtual- or augmented-reality experience without discomfort or distraction. In general, the systems disclosed herein may improve immersion and/or enjoyment of using a head-mounted display, making virtual- and augmented-reality experiences more fulfilling or useful.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, thereby enabling others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The terminology used in the description of the various embodiments described herein is for the purpose of explaining particular embodiments only and is not intended to be limiting. As used in the discussion of the various highlighted embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A head-mounted-display adjustment apparatus comprising:
   a strap comprising a distal section coupled to a distal area of a head-mounted display;
   a pinion rotatably coupled to a proximal area of the head-mounted display in a manner that holds the head-mounted display against a user's face when a user is wearing the head-mounted display;
   a rack that is coupled to a proximal section of the strap and comprises a plurality of teeth in mesh with the pinion such that:
      rotation of the pinion repositions the rack relative to the head-mounted display; and
      repositioning the rack adjusts an area between the strap and the head-mounted display; and
   a constant-force spring that:
      comprises a ribbon having a rolled portion and a protracted section that extends from the rolled portion; and
      is coupled to the rack and that is configured to provide a tension on the strap in a manner that holds the head-mounted display against the user's face when the user is wearing the head-mounted display.

2. The head-mounted-display adjustment apparatus of claim 1, wherein the pinion:
   drives a gear train that comprises a set of gears; and
   couples the rack to a slide such that rotation of the pinion moves the rack along the slide.

3. The head-mounted-display adjustment apparatus of claim 2, wherein the gear train:
   is housed by the slide; and
   increases a range of motion of the rack such that the rack is extendable beyond the pinion.

4. The head-mounted-display adjustment apparatus of claim 2:
   wherein the rack is coupled to the proximal section of the strap such that the proximal section of the strap moves in tandem with the rack; and
   further comprising a graspable knob coupled to the pinion such that rotation of the knob rotates the pinion.

5. The head-mounted-display adjustment apparatus of claim 4, wherein the graspable knob is configured to adjust a distance of the head-mounted display to a user's face when a user is wearing the head-mounted display.

6. The head-mounted-display adjustment apparatus of claim 1, wherein the constant force spring comprises resilient spring steel having a restoring force that is substantially a result of an extended portion of the ribbon that is nearest the rolled portion.

7. The head-mounted-display adjustment apparatus of claim 2, wherein the rolled portion of the ribbon is housed by the slide such that, when the rack moves away from the pinion, the ribbon unrolls and the strap extends away from the head-mounted display.

8. The head-mounted-display adjustment apparatus of claim 1, wherein the protracted section of the ribbon is anchored to the rack.

9. A head-mounted-display system comprising:
   a head-mounted display;
   a strap comprising a distal section coupled to a distal area of the head-mounted display; and
   a rack-and-pinion assembly coupled to a proximal section of the strap and a proximal area of the head-mounted display such that, when a user is wearing the head-mounted display, the strap holds the head-mounted display against the user's face, the rack-and-pinion assembly comprising:
      a pinion rotatably coupled to the proximal area of the head-mounted display; and
      a rack in mesh with the pinion such that rotation of the pinion repositions the rack relative to the head-mounted display, wherein repositioning the rack adjusts an area between the strap and the head-mounted display, wherein:
   the distal section of the strap is coupled to the distal area of the head-mounted display via an additional rack-and-pinion assembly comprising:

an additional pinion rotatably coupled to the head-mounted display; and an additional rack in mesh with the additional pinion such that rotation of the additional pinion repositions the additional rack relative to the head-mounted display.

10. The head-mounted-display system of claim 9, wherein:

the rack-and-pinion assembly is connected to a first section of the head-mounted display that is dimensioned to be positioned at a right side of the user's head; and the additional rack-and-pinion assembly is connected to a second section of the head-mounted display that is dimensioned to be positioned at a left side of the user's head.

11. The head-mounted-display system of claim 9, wherein:

the rack-and-pinion assembly further comprises:
a graspable knob coupled to the pinion such that rotation of the knob rotates the pinion; and
a constant-force spring that provides a tension holding the head-mounted display against the user's face when the user is wearing the head-mounted display; and the additional rack-and-pinion assembly further comprises:
an additional graspable knob coupled to the additional pinion such that rotation of the additional knob rotates the additional pinion; and
an additional constant-force spring that provides an additional tension holding the head-mounted display against the user's face when the user is wearing the head-mounted display.

12. The head-mounted-display system of claim 11, wherein rotation of the knob to reposition the rack relative to the head-mounted display adjusts the area between the strap and the head-mounted display separately from rotation of the additional knob to reposition the additional rack relative to the head-mounted display.

13. The head-mounted-display system of claim 11, wherein:

the constant-force spring comprises a ribbon having:
a rolled portion that is housed by a slide coupled to the rack such that, when the rack moves away from the slide, the ribbon unrolls and the strap extends away from the head-mounted display; and
a protracted section anchored to the rack that extends from the rolled portion; and the additional constant-force spring comprises an additional ribbon having:
an additional rolled portion that is housed by an additional slide coupled to the additional rack such that, when the additional rack moves away from the additional slide, the additional ribbon unrolls and the strap extends away from the head-mounted display; and an additional protracted section anchored to the additional rack that extends from the additional rolled portion.

14. The head-mounted-display system of claim 11, wherein the tension of the constant-force spring at least approximates the additional tension of the additional constant-force spring.

15. The head-mounted-display system of claim 9, wherein the strap comprises a medial section coupled to a third section of the head-mounted display that is dimensioned to be positioned at a forehead of the user.

16. A method comprising:
coupling a distal section of a strap to a distal area of a head-mounted display;
rotatably coupling a pinion to a proximal area of the head-mounted display in a manner that holds the head-mounted display against a user's face when a user is wearing the head-mounted display; and
coupling a rack with a plurality of teeth in mesh with the pinion to a proximal section of the strap such that:
rotation of the pinion repositions the rack relative to the head-mounted display;
repositioning the rack adjusts an area between the strap and the head-mounted display; and
anchoring a constant-force spring to the rack such that the spring provides tension on the strap for holding the head-mounted display against the user's face when the user is wearing the head-mounted display, wherein the constant-force spring comprises a ribbon having a rolled portion and a protracted section that extends from the rolled portion.

17. The method of claim 16, wherein:
coupling the pinion to the proximal area of the head-mounted display comprises:
coupling a slide to the rack such that rotation of the pinion moves the rack along the slide;
coupling the rack to the proximal section of the strap such that the proximal section of the strap moves in tandem with the rack;
housing a gear train, driven by the pinion, at the slide; and
the method further comprises housing the rolled portion of a constant-force spring at the slide such that, when the rack moves away from the slide, the constant-force spring unrolls and the strap extends away from the head-mounted display.

18. The method of claim 16, further comprising coupling a graspable knob to the pinion such that rotation of the knob rotates the pinion.

19. The head-mounted-display adjustment apparatus of claim 1, wherein the spring, when deflected, does not at least approximately follow Hooke's law.

20. The method of claim 16, wherein a restoring force of the spring is substantially disproportional to a deflection of the spring.

* * * * *